us009618013B2

(12) United States Patent
Cherry et al.

(10) Patent No.: US 9,618,013 B2
(45) Date of Patent: Apr. 11, 2017

(54) CENTRIFUGAL GAS COMPRESSOR METHOD AND SYSTEM

(71) Applicant: Rotational Trompe Compressors, LLC, Sandpoint, ID (US)

(72) Inventors: Mark A. Cherry, Sagle, ID (US);
Robert A. Alderman, Sagle, ID (US);
D. Hans Shillinger, Nevada, CA (US)

(73) Assignee: Rotational Trompe Compressors, LLC, Sandpoint, ID (US)

( * ) Notice: Subject to any disclaimer, the term of this patent is extended or adjusted under 35 U.S.C. 154(b) by 158 days.

(21) Appl. No.: 14/280,780

(22) Filed: May 19, 2014

(65) Prior Publication Data
US 2015/0023807 A1    Jan. 22, 2015

Related U.S. Application Data

(60) Provisional application No. 61/847,161, filed on Jul. 17, 2013.

(51) Int. Cl.
*F04F 99/00* (2009.01)
*F04D 29/70* (2006.01)
(Continued)

(52) U.S. Cl.
CPC ....... *F04D 29/706* (2013.01); *B01D 19/0057* (2013.01); *F04D 17/167* (2013.01);
(Continued)

(58) Field of Classification Search
CPC ...... F04D 17/16; F04D 17/165; F04D 17/167; F04D 29/706; F04D 31/00; B01D 19/0057
See application file for complete search history.

(56) References Cited

U.S. PATENT DOCUMENTS 871,626 A    11/1907  Pollard
892,772 A     7/1908  Taylor
(Continued)

FOREIGN PATENT DOCUMENTS

DE    1 106 028    5/1961
DE    2 356 013    5/1975
(Continued)

OTHER PUBLICATIONS

PCT International Search Report dated Oct. 31, 2014; see written Opinion Box No. V, VIII.
(Continued)

*Primary Examiner* — Charles Freay
(74) *Attorney, Agent, or Firm* — Robert C. Kain, Jr.

(57) ABSTRACT

The compressor compresses gas in capillaries leading to a radially distant annular container space. Centrifugal force acts on gas bubbles entrained between liquid slugs moving radially outward through the capillaries which may be radial, tangential or continuously curved. Compressed gas is collected in the annular space. A gas-liquid emulsion is fed to the capillaries by an inboard emulsification device. The emulsification may include a vortex generator, an ejector or a venturi injector, all feeding the gas-liquid mixture into the inboard ends of the capillaries. The capillaries are formed in a series of discs, coaxially stacked with outer disc ends open to the annular space. Capillary inlets may be perpendicular, tangential or may define a venturi jet.

44 Claims, 22 Drawing Sheets

(51) Int. Cl.
   F04D 17/16   (2006.01)
   F04D 31/00   (2006.01)
   B01D 19/00   (2006.01)
   F04D 17/18   (2006.01)

(52) U.S. Cl.
   CPC ............. F04D 17/18 (2013.01); F04D 31/00 (2013.01); *F05D 2210/132* (2013.01)

(56) References Cited

U.S. PATENT DOCUMENTS

| | | | | |
|---|---|---|---|---|
| 1,101,929 | A | * | 6/1914 | Hayes ................... F04D 17/18 417/108 |
| 1,144,865 | A | | 6/1915 | Rees |
| 1,457,536 | A | * | 6/1923 | MacLean ............... F04D 17/18 417/67 |
| 1,769,260 | A | | 7/1930 | Hughes |
| 1,864,640 | A | | 6/1932 | Dalrymple |
| 2,025,037 | A | * | 12/1935 | Bergmann ............. F04D 17/18 417/118 |
| 2,076,586 | A | | 4/1937 | Noble |
| 2,230,183 | A | * | 1/1941 | Ford ..................... F04D 17/18 417/323 |
| 2,260,600 | A | | 10/1941 | Boeckeler |
| 3,517,229 | A | | 6/1970 | Bidard |
| 3,559,419 | A | | 2/1971 | Kantor |
| 3,584,978 | A | * | 6/1971 | Shimoi .................. F04D 17/18 417/244 |
| 4,027,993 | A | | 6/1977 | Wolff |
| 4,439,200 | A | | 3/1984 | Meyer |
| 5,011,371 | A | | 4/1991 | Gottemoller |
| 5,154,583 | A | | 10/1992 | Althaus et al. |
| 5,733,253 | A | | 3/1998 | Headley |
| 6,276,140 | B1 | | 8/2001 | Keller et al. |
| 6,713,028 | B1 | | 3/2004 | Oklejas |
| 7,905,360 | B2 | | 3/2011 | Della Casa |
| 2003/0106302 | A1 | | 6/2003 | Ray |
| 2004/0101414 | A1 | | 5/2004 | Gharib et al. |
| 2005/0047270 | A1 | | 3/2005 | Wood et al. |
| 2005/0175449 | A1 | | 8/2005 | Yonehara |
| 2006/0059904 | A1 | | 3/2006 | Shevket |
| 2011/0030359 | A1 | | 2/2011 | Fong |
| 2011/0115223 | A1 | | 5/2011 | Stahlkopf |

FOREIGN PATENT DOCUMENTS

| | | |
|---|---|---|
| FR | 2 248 731 | 5/1975 |
| WO | 83/02134 | 6/1983 |
| WO | WO 83/02134 | 6/1983 |

OTHER PUBLICATIONS

European Supplementary Examination Report, Jun. 23, 2016.
Patent Cooperation Treaty International Search Report, Sep. 1, 2016.
PCT Notification of Transmittal of International Preliminary Report on Patentability, Apr. 10, 2015.
Notification of Transmittal of the International Search Report PCT/US/2015/055427, Feb. 2, 2016.

* cited by examiner

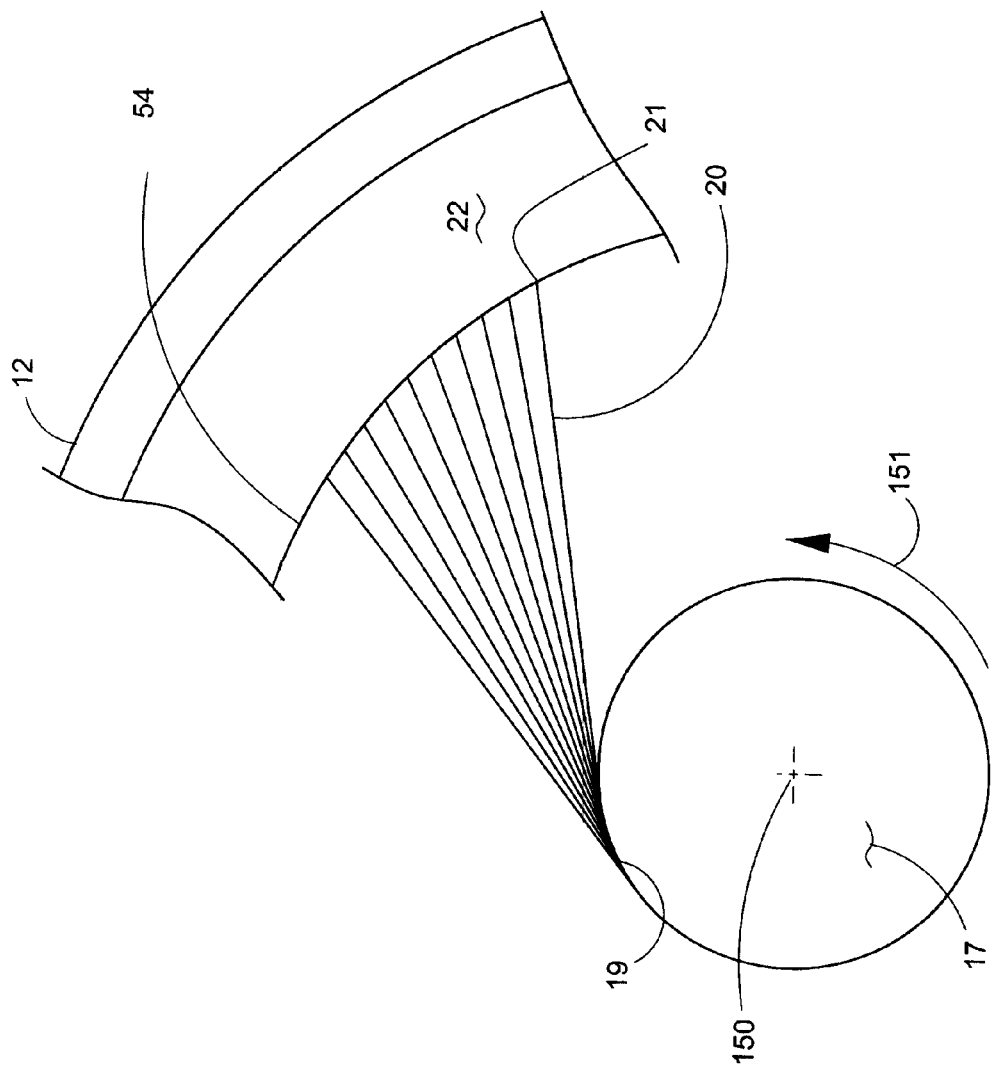

CENTRIFUGAL GAS COMPRESSOR METHOD AND SYSTEM

This is a regular patent application based upon and claiming the benefit of provisional patent application Ser. No. 61/847,161 filed Jul. 17, 2013, the contents of which is incorporated herein by reference thereto.

The present invention relates to a centrifugal gas compressor, a method for compressing gas using centrifugal forces in a plurality of capillary passages leading radially to an annular collection cavity, and a system for centrifugal gas compression.

BACKGROUND OF THE INVENTION

Gas compressors are used for many items in the consumer market (to inflate basketballs, toys and tires) and in the industrial market (to compress gas for transport, for powering pneumatic tools and for distributing natural gas from the well head to the user).

The efficiency of prior art commercial gas compressors is poor primarily because practicalities require that the gas be compressed rapidly. Rapid compression makes it nearly impossible to dissipate the heat of compression during the compression process. This inherent heating during the compression process (herein "C-heat") demands up to 100% more physical work from the prime mover than if the same process was done with complete "C-heat" removal. Typically the prime mover is an internal combustion engine or an electric motor. A rapid compression process with little or no C-heat removal is called an adiabatic compression. Most state of the art compressors operate with adiabatic or semi-adiabatic compression cycles. The energy or work lost due to C-heat increases as the final target pressure for the compressor increases.

If the C-heat can be stored with the compressed gas, then the work potential of the compressed gas would be roughly equivalent to the work required to compress the gas. However, most compressed gas is stored in an uninsulated pressure vessel and the time between the compression of the gas and the use of the gas makes retention of the heat in the gas impractical. Therefore, this 50-100% additional work to compress the gas is lost or wasted. Compression is done while removing all of the C-heat is called isothermal compression. If isothermal compression can be achieved, the energy required to get the same useful work output from the compressed gas could theoretically be cut in half. Stated otherwise, twice the amount of compressed gas can be generated for the same amount of cost in energy or dollars. Historically isothermal compression has been impractical or impossible to achieve because the time for the C-heat to be removed from the walls of the compression device mandates a very slow compression cycle so that heat removal can keep pace with the heat generated by the compression.

Only one type of prior art compressor demonstrates rapid isothermal compression. U.S. Pat. No. 892,772 to Taylor, patented in 1908, discloses a hydraulic air compressor which utilizes a falling column of water infused with millions of tiny spherical bubbles. When the falling column of water falls from a particular height, the bubbles in the water are compressed. Taylor used a 70 foot differential head pressure (about 21 meters) which creates approximately 128 psi (pounds per square inch) pressure to drive 5000-6000 horsepower isothermal compressors.

U.S. Pat. No. 6,276,140 to Keller discloses a device to generate energy through a turbine engine. The Keller device also uses falling water fed through a funnel shaped vertical tube or tunnel in order to compress air bubbles in the falling water. The waterfall drop in Keller was between 30-100 meters. Typical diameters at the top of the Keller funnel tube are approximately 2-7 meters and, at the bottom, the funnel outlet region is typically 0.7-2.0 meters.

U.S. Pat. No. 1,144,865 to Rees discloses a rotary pump, condenser and compressor. However, the Rees '865 rotary pump compressor utilized large cavities having highly curved shaped walls and the cavities were not radial with respect to the rotating container. A turbine-air compressor is disclosed in U.S. Pat. No. 871,626 to Pollard.

U.S. Patent Application Publication No. 2011/0030359 to Fong generally discusses a centrifugal separator in paragraphs 963, 964, 959 and 983. However, there are no details of the centrifugal separator. U.S. Patent Application Publication No. 2011/0115223 to Stahlkopf also discusses centrifugal separators. Neither Fong '359 or Stahlkopf '223 discuss a centrifugal compressor which compresses bubbles in water or a liquid in an isothermal manner to extract the compressed air or gas.

OBJECTS OF THE INVENTION

It is an object of the present invention to provide a centrifugal gas compressor and a method for compressing a gas entrained in a liquid or an emulsion or a gas-liquid mixture.

It is another object of the present invention to provide a centrifugal gas compressor and a method therefor which is essentially isothermal in nature.

SUMMARY OF THE INVENTION

The centrifugal gas compressor provides a method for compressing a gas entrained in a liquid. The container is rotatable about an axis with a plurality of capillary passages which lead radially to radially outboard ends terminating in a substantially annular container space. An emulsion of gas and liquid is fed into radially inboard ends of the plurality of capillary passages. The rotation of the container causes formation of gas bubbles in the capillary passages and compresses the gas bubbles in the capillaries towards the radially outboard ends of the capillaries. Compressed gas bubbles are collected in the liquid-gas mix forced to the annular container space. The compressor draws off the compressed gas released from bubbles buoyantly emerging from the gas-liquid mixture in the annular container space. The capillaries may be (i) substantially radial, (i) substantially tangential with respect to the axis of rotation of the container, or (iii) continuously curved forward, in the direction of the rotation or backward, contrary to the rotation of the container. Gas and liquid portals, near the radially inboard region of the container draw off liquid and gas. Each capillary is a micro-channel and has a small substantially uniform cross-section which causes formation of gas bubbles near radially inboard portions of the capillaries. A gas-liquid emulsion is created prior to feeding the mix into the capillaries by one of an ejector which ejects either gas into liquid or liquid into gas, or a venturi injector of a vortex generator. The resulting emulsion from the radially inboard container cavity is fed to the capillaries.

The emulsion is fed into the capillaries via one of: a substantially radial passage from the vortex to the capillaries, a tangential passage from the vortex to the capillaries, or a venturi effect passage from the vortex to the capillaries.

The gas is compressed in an isothermal process. The compressor isothermally compresses gas bubbles captured in the capillaries.

The centrifugal gas compressor fed with a gas and a liquid via a single or via separate inlet ports. The container is rotated by a prime mover about its axis. An emulsification device in a radially inboard cavity is supplied the gas and liquid, which in turn feeds the emulsified gas-liquid mixture into the capillaries. The emulsification device includes one of: an ejector, a venturi injector or a vortex generator. In another embodiment, the vortex generator is upstream of the ejector or venturi injector. The ejector or venturi injector defines a plurality of capillary inlet channels fluidly coupled to the capillaries. Each capillary inlet channel has a longitudinal centerline which is substantially aligned with the longitudinal centerline of the respective capillary. Each capillary inlet channel has a radially inboard terminal end open to the radially inboard cavity and the inlet may be: normal to the axis of rotation of the container, tangential to the axis of rotation of the container or a fluid inlet formed as a venturi effect passage. The capillaries are defined in several discs. The discs are stacked next to each other, coaxial with the container. The radially inboard edge of each disc defines the radially inboard terminal ends of the capillaries. The radially outboard disc edge defines the radially outboard terminal ends of the capillaries and is open to the annular container space.

BRIEF DESCRIPTION OF THE DRAWINGS

Further objects and advantages of the present invention can be found in the detailed description of the preferred embodiments when taken in conjunction with the accompanying drawings in which:

FIG. 16 diagrammatically illustrates tangential capillaries; and

DETAILED DESCRIPTION OF EMBODIMENTS OF THE INVENTION

Figure 1:
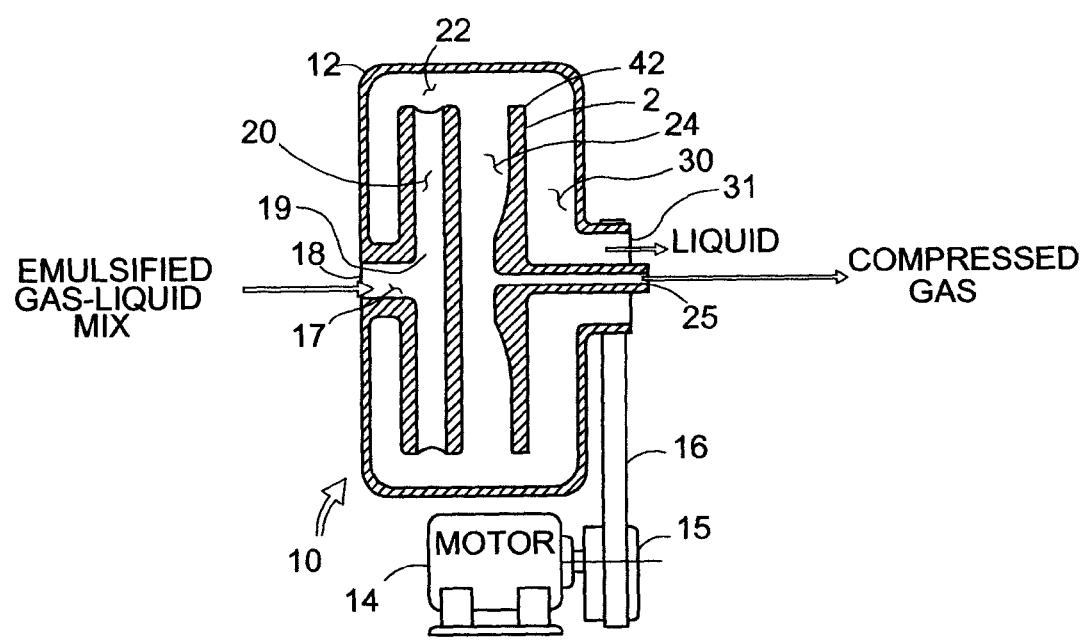
FIG. 1 diagrammatically illustrates one basic embodiment of the centrifugal gas compressor.

The present invention relates to a method for compressing a gas entrained in a liquid (such as air entrained in a water, or an emulsified air-liquid mixture, or natural gas (in a gaseous state) entrained in liquified natural gas, among others) in a centrifugal gas compressor. Similar numerals designate similar items throughout the patent specification.

An ideal compressor would apply force to a spherical surface that reduces in diameter to compress the gas. Unlike a piston or screw compressor, a spherical compressor surface area reduces the sphere by the 3rd power of its radius. A piston's surface area remains constant and therefore requires increasing force to overcome the increasing gas pressure. However, in a spherical compressor, the square inches of spherical surface area (translated to pounds per square inch (PSI)) are reduced by the third root of the volume change. Therefore, a spherical compressor would nearly cancel out the increasing force of the increasing gas pressure. An ideal spherical compressor is impossible to build with solid mechanical mechanisms, such as a piston/cylinder or rotary screw. However a spherical void trapped in a falling liquid column that is increasing in pressure embodies this ideal compressor. See U.S. Pat. No. 8,927,782 to Taylor.

A bubble of gas has an ideal spherical shape and millions of tiny bubbles represent a gas-liquid mixture which having a very-high-surface area necessary to facilitate heat transfer.

This gas-liquid surface area is also in close proximity to the gas being compressed. This system allows the heat of compression to be extracted from each compression bubble at the same rate that the heat is being generated. Therefore, a bubble gas compressor embodies an ideal gas compressor type and an ideal isothermal heat removal system in one compressor design.

A centrifugal force generated by a centrifuge can compress gas bubbles. In a centrifugal field, the system can increase the weight of a column of water (the water or liquid from a radially inboard container region to a radially outboard region) by subjecting it to several thousand G forces. A wide range of final pressures for a centrifugal bubble compressor can be achieved by changing the RPM (revolutions per minute) of the device. The final pressure is only limited by the physical strength of the compressor housing. There are no reciprocating parts, so very high RPMs are possible.

The centrifugal force of a spinning column of water at different radii ("R") is calculated using the G force calculation formula for laboratory centrifuge operation. Empirical tests on the early versions of the inventive centrifugal gas compressor proved that these calculations were accurate.

The centrifugal compressor of the present invention involved modeling centrifugal forces acting on the liquid and the performance of bubbles in the liquid under pressure. A bubble's tendency to rise to the surface of the liquid is its buoyant force which is the difference between the density of the substance in the void (the gas) and the physical weight of the liquid due to gravitational acceleration. The buoyant force of a gas bubble is counteracted by the drag or friction at the gas bubble void's surface or interface with the liquid. The terminal velocity of a bubble is calculated using Stokes Law. Therefore, the speed of the falling column of water (see Taylor '772) must exceed the bubble rise velocity in order to make the bubbles sink. In a centrifugal gas compressor, the buoyant force of the gas bubble is directed radially inboard, towards the axis of rotation of the container. To compress the gas, the bubble must be forced to move radially outward. Therefore, the buoyant force must be less than the centrifugal force acting on the gas bubble, that is, the centrifugal force on the liquid intermediate the bubble and the axis of rotation must be greater than the buoyant force.

If the gas is air, a constant volume void displaces the same amount of water and the buoyant force of the bubble increases in a linear fashion as the weight of the water also increases the further the bubble moves or travels away from the center of rotation. When a gas bubble is initially subject to centrifugal compression, an initial rapid rise in buoyancy is noted when the psi is in the range of 1-3 ATM due to the fact that the weight of the water is increasing faster than bubble volume is shrinking. This phenomenon was discovered during initial prototype testing. This problem also explains the difficulties in forcing the gas bubbles to travel radially outboard with the water and into the radially outboard container space. Since G forces in the centrifugal compressor increase with distance from the center of rotation, bubble buoyancy spikes at first (in the radially inboard region) and then decreases. Then bubble volume begins to shrink faster than the increase in water weight.

As long as the water velocity along the longitudinal extend of the capillary is greater than the terminal rise velocity of the bubbles, experiments show that the gas bubbles were forced to "sink" or move radially outboard and enter the radially outboard container region. In the radially outboard container region, the bubbles rapidly separate from the water, emerge from the compressed air-water mixture and move to the compressed gas collection container region. The bubbles in the radially outboard container region emerge from the radially inboard water surface (the water with compressed gas being forced to the radially outboard region) due to their centrifugally enhanced buoyancy. This rapid air separation in the radially outboard container region is a distinct advantage of the centrifugal compressor. Due to this buoyancy phenomena, the entrainment in the outboard region and initial compression of the bubbles in the inboard region are some of the several important features of the present invention (among others).

Figure 17:
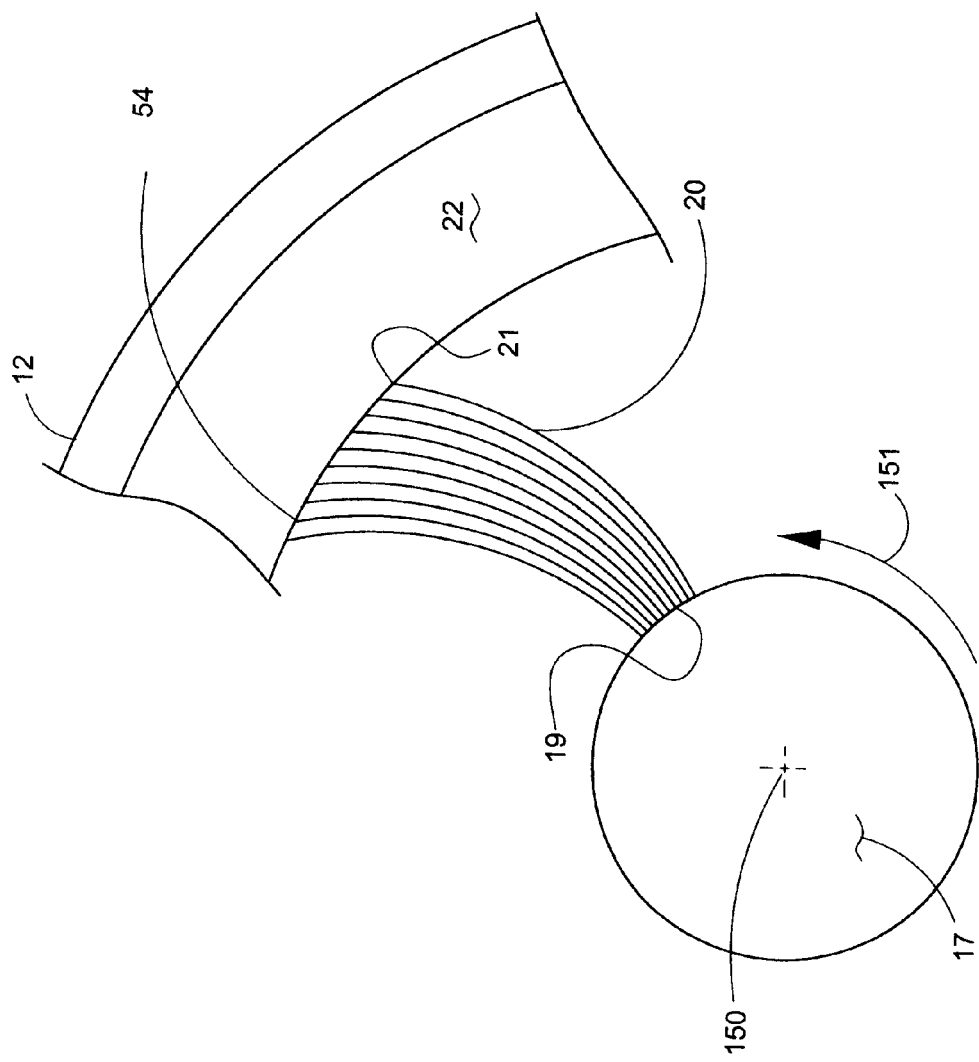
FIG. 17 diagrammatically illustrates continuously curved capillaries which radially lead to the annular collection cavity (a backward swept curve or swirl).

The centrifugal force, acting on the intermediate slugs or caches of liquid in the capillary tubes leading radially to the annular collection cavity, is generally the same without regard to the whether (a) the capillaries are substantially radial (see FIGS. 1 and 7); or (b) the capillaries are tangential to the axis of rotation (see FIG. 16); or (c) the capillaries are continuously curved but leading to the outboard collection chamber (FIG. 17). The path of travel seems to be less important than the capillary effect on the gas bubble travel.

The capillary tube design of the present invention solves a problem that was never identified nor studied in connection with U.S. Pat. No. 1,144,865 to Rees (a centrifugal gas compressor). Effectively, the Rees '865 centrifugal gas compressor never worked well and never went into production or generated reasonable commercial sales. Rees '865 does not disclose nor discuss a radially aligned capillary system for a centrifugal gas compressor.

One problem with the Rees '865 system is that no one analyzed the very powerful bubble buoyancy effect created in a centrifugal three field. In fact, this bubble buoyancy attribute is widely used in industry to spin a gas-liquid mixture in a centrifugal field and to separate gas bubbles from liquid. The bubble buoyancy is so large that the gas spins out of the liquid without compression.

The use of capillary tubes to engineer bubble size (to control bubble diameter and prevent agglomeration of bubbles) and further to prevent the compressed gas bubbles from finding a pathway around the radially inboard liquid are several important features of the present invention among others. The liquid slug in a capillary tube is analogous to a piston that compresses the intermediate bubbles and forces the bubbles to the periphery of the spinning compressor (the radially outboard region of the rotating container). If the bubble is allowed to travel laterally relative to the liquid piston slugs velocity vector. At the outboard collection cavity, the bubble escapes and its own buoyancy carries the bubble back towards the center of the spinning compressor. This lateral motion of the bubble in the capillary passage is analogous to leaking or improperly set piston rings in a conventional compressor. If lateral motion of the bubble can be eliminated, then the liquid piston slug, which weighs 800 times the weight of the gas bubble, will force the bubble to travel with the liquid piston to the periphery of the compressor where the pressures are the highest in the centrifugal field.

Capillary dimensions are determined by the inner tube diameter to allow the bubble to seal the tube and to prevent any liquid from finding its way around the bubble. The capillary tubes or passages herein are micro-channels, sized on the order of 3.0 mm to about 0.5 mm. In this way with the micro-channel capillary, the liquid above the bubble (radially inboard with respect to the gas bubble) must force the bubble to travel the length of the capillary tube and exit at the high pressure end of the tube rather than letting buoyancy force a return of the bubble to the low pressure side of the tube (the radially inboard region of the tube). An early prototype of the inventive centrifugal gas compressor used 450 radially disposed capillary tubes to prove up bubble entrainment with the liquid slugs in capillary tubes radially leading to the collection cavity or cavities and the effectiveness of the present centrifugal gas compressor.

In order to keep air bubbles from growing beyond a predetermined diameter, the present invention, in one embodiment, uses a multiplicity of microchannel capillary tubes that physically constrain the maximum bubble diameter to the inner diameter of the tube. The maximum bubble diameter or size is limited in the x and y axis wherein longitudinal travel outward of the tube is the z axis. Preferably, the inner diameter of the capillaries is uniform throughout the radial extent. Micro-channel passages are usually single digit mm or smaller. In one embodiment, capillary tubes with inner diameters of 0.0625 inches (1.59 mm) spin at 3600-4000 rpm to create 120-200 ATM pressure at the outer region of the container. One problem is that bubbles naturally join each other and form larger bubbles, which increases the amount of displaced water volume and thus buoyancy. Since the weight of displaced water is greater the further away from center due to centrifugal acceleration, the buoyancy is proportionally greater due the increased weight of the displaced water. Since air is compressible and is decreasing in volume as the air is compressed by the radially inboard liquid.

In addition to preventing increased buoyancy of the bubbles in the air/water emulsion with the capillary tubes, isothermal compression requires the maximum amount of surface area to be in direct contact with the water. Smaller bubbles have a dramatically higher surface area in contact with the water. This high surface to volume ratio facilitates rapid (near instantaneous) heat transfer to the water, thereby keeping the air at a constant temperature during the compression process. Water has 3500 times more heat capacity than air on a equal volume basis. Therefore it is nearly impossible for the air to increase in temperature from the heat of compression as the water absorbs this energy rapidly.

Another important feature of the micro-channel/capillary tubes, among other important features, is that once a bubble grows to the inner diameter of the tube, the bubble acts like a check valve that prevents the bubble's buoyant force from reversing the radially outward direction of the bubble and water flow. This feature of the present invention can be called unidirectional compressed gas or bubble flow longitudinally along the micro-channel capillary. This capillary check valve feature with the intermediate liquid slug requires that the only gas bubble motion is motion away from the center of rotation toward the high pressure exit of the compression capillary tube. This is due to the surface tension of the liquid. This bubble effectively creates a "dry surface" around its equator where it touches the inner diameter of the tube. This dry surface section prevents the water slug above (radially inboard) the bubble from finding a pathway around the bubble to the next radially outboard slug. If the water or liquid flows around the bubble, then its motive force on the entrained intermediate bubble is lost and the bubble moves closer to center of rotation rather than toward the radial exit of the compression tube. Therefore, the capillary check valve action or unidirectional flow is one of the important features of the present invention, among others.

As an analogy, the compression tube operation is comparable to the slug of water or liquid acting as a miniature liquid piston. The liquid piston plug is being forced radially outboard along the compression tube by centrifugal force. A bubble is intermediate each liquid piston and the bubble is being compressed by the liquid piston due to centrifugal force. In order to maintain the function of the piston, a seal is necessary to keep the air trapped by the piston. The dry ring where the bubble touches the wall of the micro-channel compression tube is the seal that keeps the bubble in position relative to the liquid piston and the piston radially inboard or on top of the bubble. This is a "trapped" bubble. The water-air-water-air-water-air sequence (an entrained gas bubble between two liquid slugs) may be called a "bubble train".

This bubble-air sequence, in one embodiment, cycles 1920 times per tube per second at the engineered target flow rate. With 450 capillary tubes, the inlet frequency of bubble/ air cycling is 864,000 times per second. In the 100 CFM model, this intake air followed by a miniature liquid piston will be 15 million times per second (at the engineering design target flow rate). For these reasons, the capillary tube design solves the problem of the Rees '865 centrifugal system. Rees never identified the problem nor solved the problem caused by the very powerful bubble buoyancy created in a centrifugal force field. Using capillary tubes to engineer the bubble size (to control bubble diameter and prevent agglomeration of bubbles) and prevent the liquid from finding a pathway around the bubble are some important aspects of the present invention, among others.

The liquid is designed to be a piston that compresses the bubbles to the periphery of the spinning compressor. If the bubble is allowed to travel laterally relative to the liquid pistons velocity vector, then the bubble escapes and its own buoyancy carries it back to the center of the spinning compressor. This lateral motion of the bubble is analogous to leaking or missing piston rings in a conventional compressor. If lateral motion of the bubble can be eliminated, then the liquid piston, which weighs 800 times the weight of the gas bubble, will win and force the bubble to travel under the liquid piston to the periphery of the compressor where the pressures are the highest in the centrifugal field.

The capillary dimensions are determined by the tube diameter which will allow the bubble to seal the tube and prevent any liquid from finding its way around the bubble. In this way the liquid above the bubble must force the bubble to travel the length of the capillary tube and exit at the high pressure end of the tube rather than letting buoyancy return the bubble to the low pressure side of the tube. The capillary effect for different sized tubes and materials and the effect on various liquids can be established by a scientific review of prior art literature. Therefore various liquids may be used to compress different gases via the capillary micro-channel tubes.

Since the bubbles have a relatively large surface to volume ratio, the compression is an isothermal event. Therefore, the outlet temperature of the compressed gas is substantially the same as the inlet temperature of the gas. The compressive operation generally occurs at a constant temperature.

Figure 2:
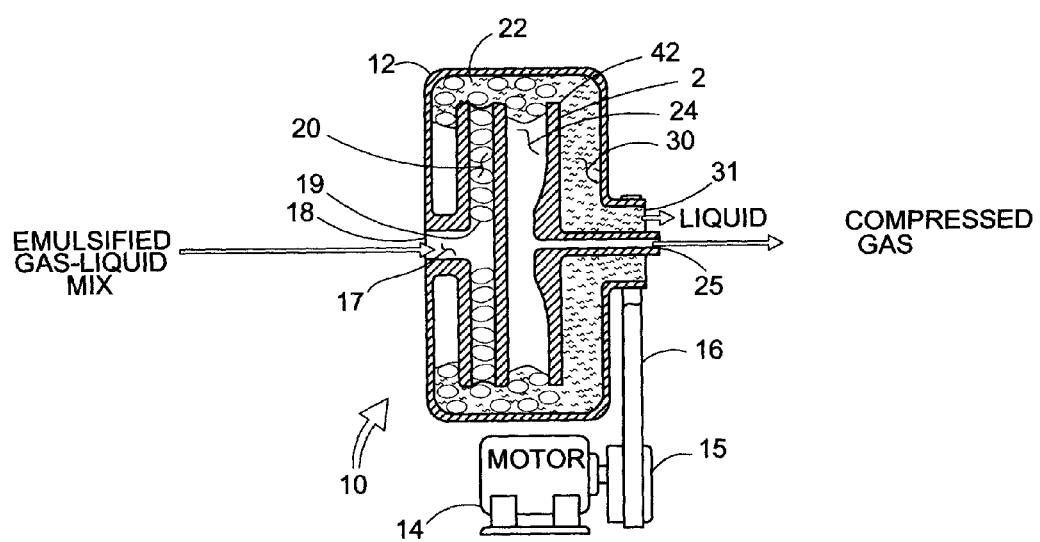
FIG. 2 diagrammatically illustrates one basic operation of the centrifugal gas compressor and method for compressing gas entrained and a liquid.

FIG. 1 diagrammatically illustrates the centrifugal gas compressor and FIG. 2 shows the compressor generating compressed gas. FIGS. 1 and 2 are discussed concurrently herein.

FIG. 1 shows centrifugal gas compressor 10 formed by a container 12 which is rotated about an axis of rotation by a prime mover or motor 14. Motor 14 is attached to transmission drive 15 and belt or chain 16.

Container 12 has an inlet 18 into which is fed gas and liquid. Inlet 18 leads to radially inboard cavity 17. The gas and liquid is emulsified and the emulsified gas-liquid mixture includes small bubbles of the gas entrained in the liquid.

The liquid is in a continuous phase in the emulsion. The gas bubbles are in a discontinuous phase in the emulsion. In some respects, the gas and the liquid are immiscible. Compressor 12 has a plurality of capillary passages 20 leading in a radial manner to collection cavity space 22. Each passage has a radially inboard inlet 19 and a radially outboard outlet or terminal end 21. Capillary inlet 19 is open to a radially inboard space 17 of container 12. The container also defines or establishes an annular container space 22. Annular container space 22 is substantially annular. There may be some supporting walls or ribs to stabilize the internal structural components of the gas compressor 10 in annular space 22. However the annular space captures output from the capillary tubes. Different groups of tubes may end in segmented annular cavities or regions.

In the simplified embodiment shown in FIGS. 1 and 2, compressor 10 and primarily container 12 includes a gas separation chamber 24 which ultimately leads via a gas drain passage to gas output or outlet port 25. A liquid drain 30 is provided which leads via a liquid drain passage to liquid output drain or portal 31. The liquid drain off edge 42 separates the liquid from the gas region 24.

FIG. 2 shows that the gas and liquid enters inlet 18 and emulsified the radially inboard cavity 17 of container 12. Capillary passages 20 are relatively small micro-channels and bubbles form inside the capillary passages. The bubbles are separated by liquid slugs. As the container rotates, the liquid is relatively incompressible as compared with the gas in the bubbles. Therefore, the bubbles compress as they move from a radially inboard region near the axis of rotation as compared to the radially outboard region near capillary outlet 21. The bubbles move in a singular or unidirectional flow outboard. Due to centrifugal force, the liquid is also forced radially outboard into the annular space 22. Since the centrifugal force acting on the entrained liquid overcomes the buoyant force of the bubbles, the compressed gas bubbles are moved to and are captured in the annular space. When the liquid with the compressed bubbles reach separation chamber 24, the buoyant force of the bubbles is greater than the centrifugal force acting on the bubbles because there are no liquid slugs moving radially outward through the capillary passages. Therefore, the bubbles rise to or emerge from the liquid surface 23 and burst thereby releasing the compressed gas into gas separation chamber 24. The gas is drawn from separation chamber 24 by appropriate gas passages which lead to gas outlet 25. Liquid or water is drawn off from annular space 22 via appropriate passages and lead to liquid drain portal 31.

Figure 3:
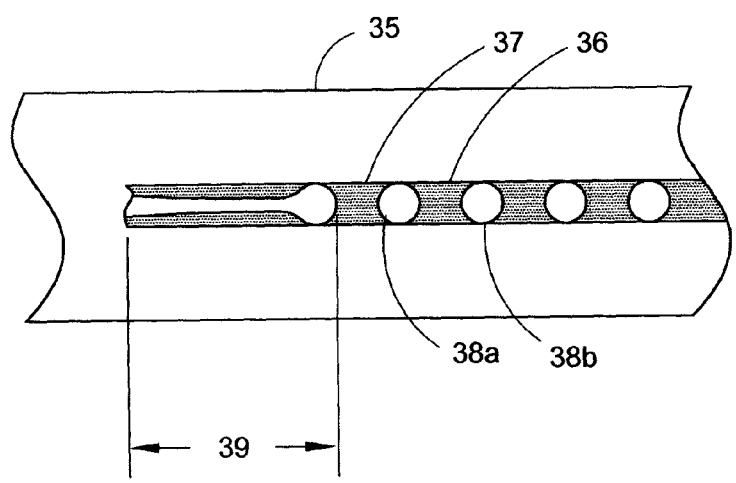
FIG. 3 diagrammatically illustrates bubbles separated by liquid slugs entrained in a capillary tube.

FIG. 3 diagrammatically illustrates bubble formation in a capillary tube 35 defining a capillary passage 36. The radially inboard end of capillary tube 35 is to the left of FIG. 3. Therefore, at a radially inboard region 39, the bubble has not been formed. However, the bubbles 38a and 38b are formed in regions which are radially distant from the inboard region 39. A liquid slug 36 separates bubbles 38a, 38b. The buoyancy of bubbles 38a, 38b attempt to "rise" and provide a force to the left in FIG. 3. The counter force, which is the centrifugal force acting on liquid slug 36, forces bubbles 38a, 38b to the right which is radially outboard of the spinning container. Experiments have shown that it is most difficult to obtain a bubble formation in the radially inboard region 39. The micro-channel capillaries solve this problem. Once the absolute pressure has been established at a level exceeding about 3 atmospheres (ATM), bubble formation in the region seems to be established.

In one embodiment, capillary passages having 0.0625 inch (1.59 mm) inside diameters operating at a container speed of 3600-4000 rpm are sufficient to obtain compressed air from an emulsification of air and water. In a test, a 50% air-water emulsion was utilized.

One important advance to refine the operation of the inventive centrifugal gas compressor and method (among others) was the discovery that the system can operate efficiently by increasing the number of radial capillary passages or channels by over 1000 and by reducing the diameter of those capillary passages to very small capillary tubes. The objective was to physically constrain the size of the bubbles to capillary tube dimension. By having small capillary tubes, bubble agglomeration is reduced which results in the elimination of larger bubble diameters with increased buoyancy. The buoyancy is a physical obstacle to centrifugal compression since the bubbles must move radially outward with the radially outward liquid flow in order to be compressed and reach higher pressures.

The second beneficial feature of using a multiplicity of capillary tubes is that the capillary diameters are small and the bubbles become trapped beneath the water. Since the bubbles become trapped in the small diameter capillary tubes, it is not possible for the bubble to float back radially inboard to the entrance of the capillary tube. In this manner, the only way for the bubble to leave the capillary tube is to be pushed by the slugs of liquid and further compressed by the liquid until the bubble reaches the radially outer end of the capillary tube. At the terminal end of the capillary tube, the bubble has been fully compressed to the full pressure of the water for that radius and rpm condition. Without a multiplicity of capillary tubes, the bubbles return to the inner diameter of the centrifugal compressor and the compression of the air or gas does not occur.

Figure 4:
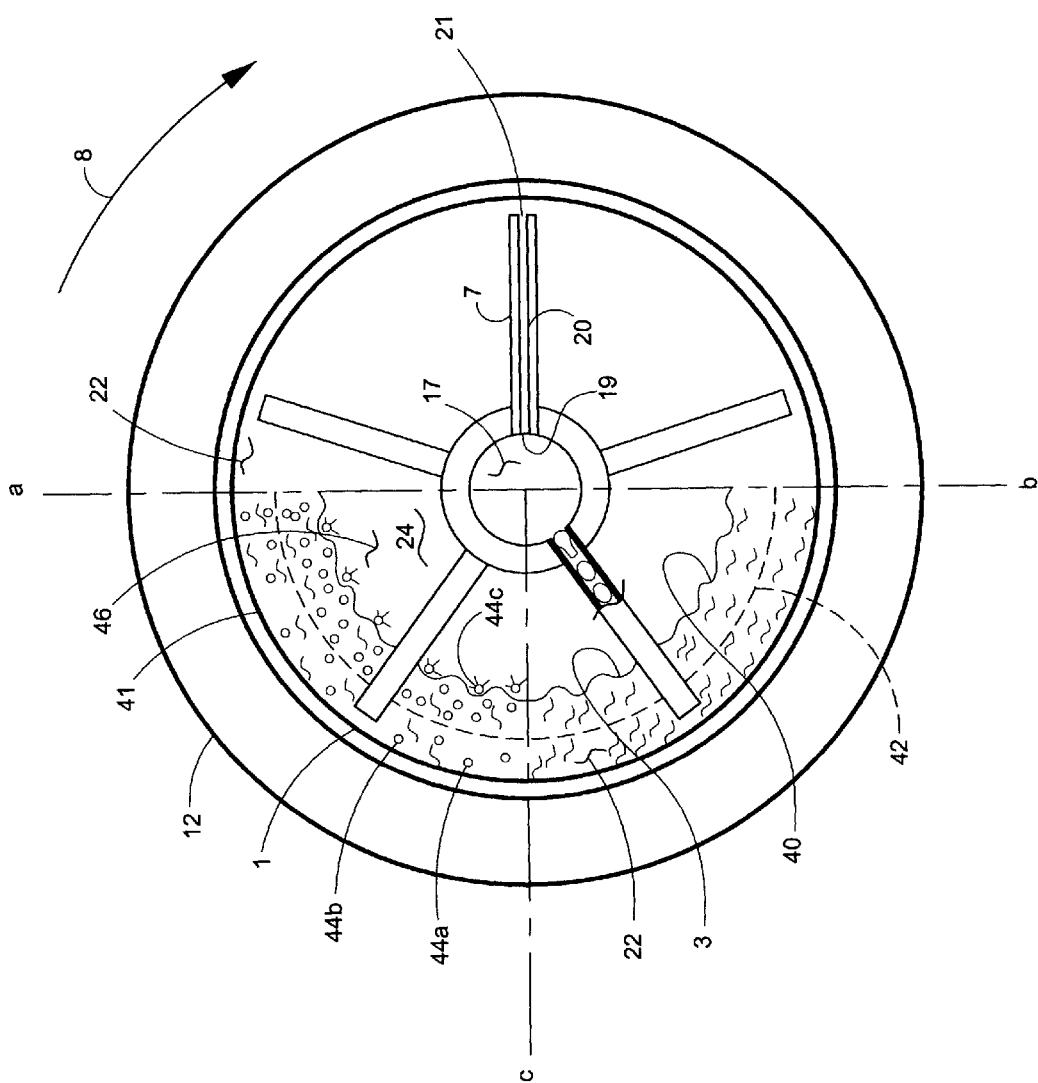
FIG. 4 diagrammatically illustrates another embodiment of the present invention showing a centrifugal gas compressor with a small number of capillary tubes and passages.

FIG. 4 diagrammatically shows one embodiment of the centrifugal gas compressor. The radially inboard cavity 17 when in use is flooded with the liquid-gas emulsion as shown in the left hemisphere of FIG. 4 between 180 degrees and 360 degrees, that is, between circumferential point "a" counterclockwise to circumferential point "b." From circumferential point "a," in a clockwise direction to circumferential point "b," the container 12 is not shown in an operating condition. Compressed gas bubbles are shown in liquid 41 in the 90 degree region of FIG. 4 from peripheral point "c," in a clockwise direction, to peripheral point "a." The bubbles are not shown in the radial segment b-c but are present in the compressed gas-liquid region 22. Tube 7 has a capillary passage 20 with a capillary input 19 and a radially distant terminal end output 21. Container 12 is rotated in a clockwise direction as shown by arrow 8 in FIG. 4. Liquid and compressed gas bubbles 44a, 44b accumulate in an annular container space 22 near the inboard wall 1 of container 12. The radially outer edge 42 of liquid drain separation wall 2 (shown in FIG. 1) permits liquid to be drained off space 22. As long as the compressed gas-liquid mixture level 40 is above wall edge 42, compressed gas can be drawn off space 46. As explained earlier, bubbles are formed in capillary passage 20 and are forced radially outward of capillary tubes 7 until the compressed gas and the bubbles and the liquid slugs intermediate the gas bubbles enter annular container space 22. When the compressed bubbles and the liquid is in annular space 22, the buoyant force of bubbles causes the bubbles to rise and emerge from the surface 3 of the liquid. This is shown as emergent bubble 44c in the radial segment c-a in FIG. 4. A gas separation passage region 24 carries the gas to the outlet 25 in FIG. 1.

Figure 5:
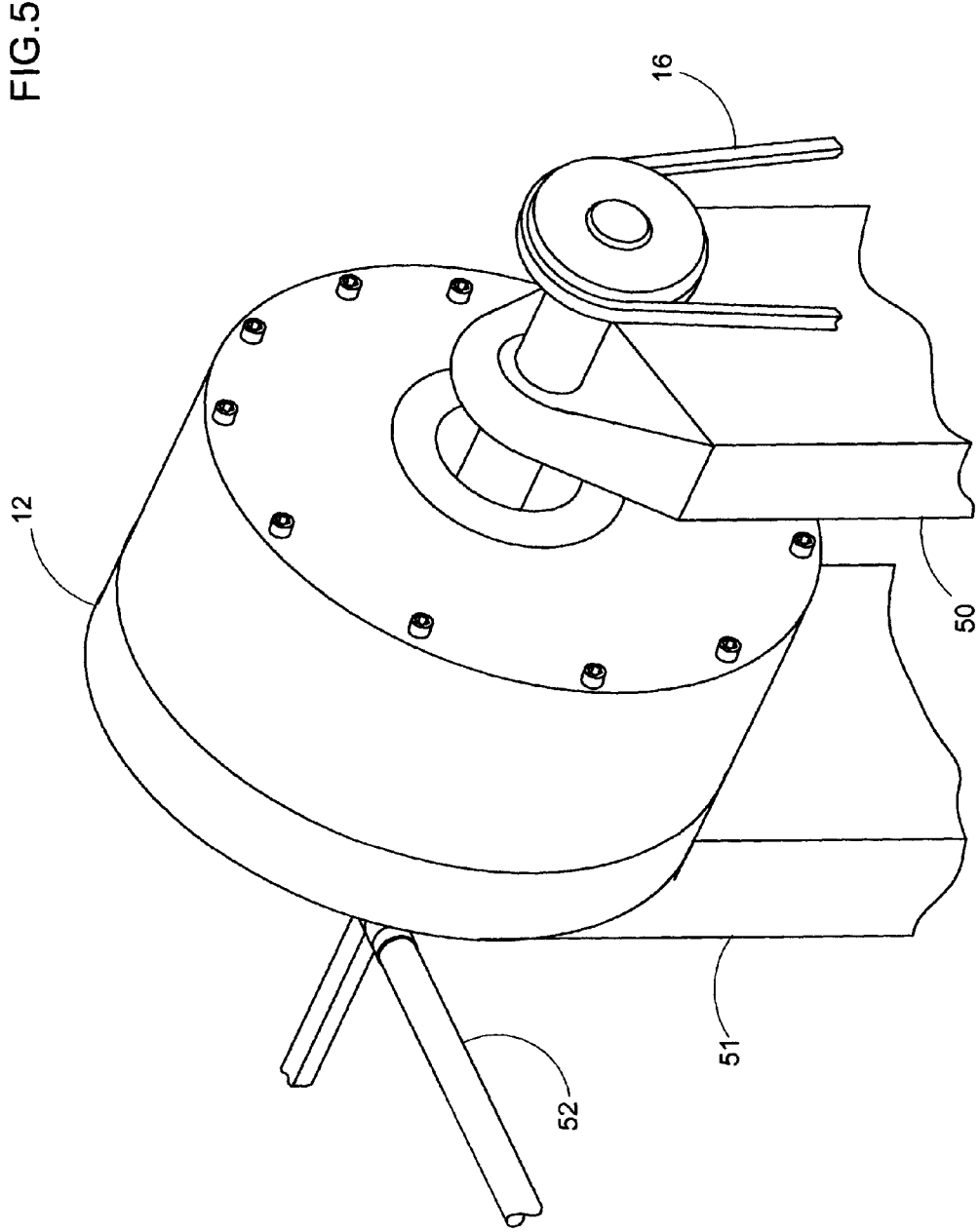
FIG. 5 diagrammatically illustrates the outer container for the compressor shown in FIG. 4.

FIG. 5 diagrammatically illustrates another embodiment of the present invention. A prime mover (not shown) causes belt or chain 16 to rotate container 12. Container 12 is rotatably mounted on stand 50, 51. Gas is drawn off from the compressed gas outlet 25 (FIG. 1) by hose 52.

Figure 6:
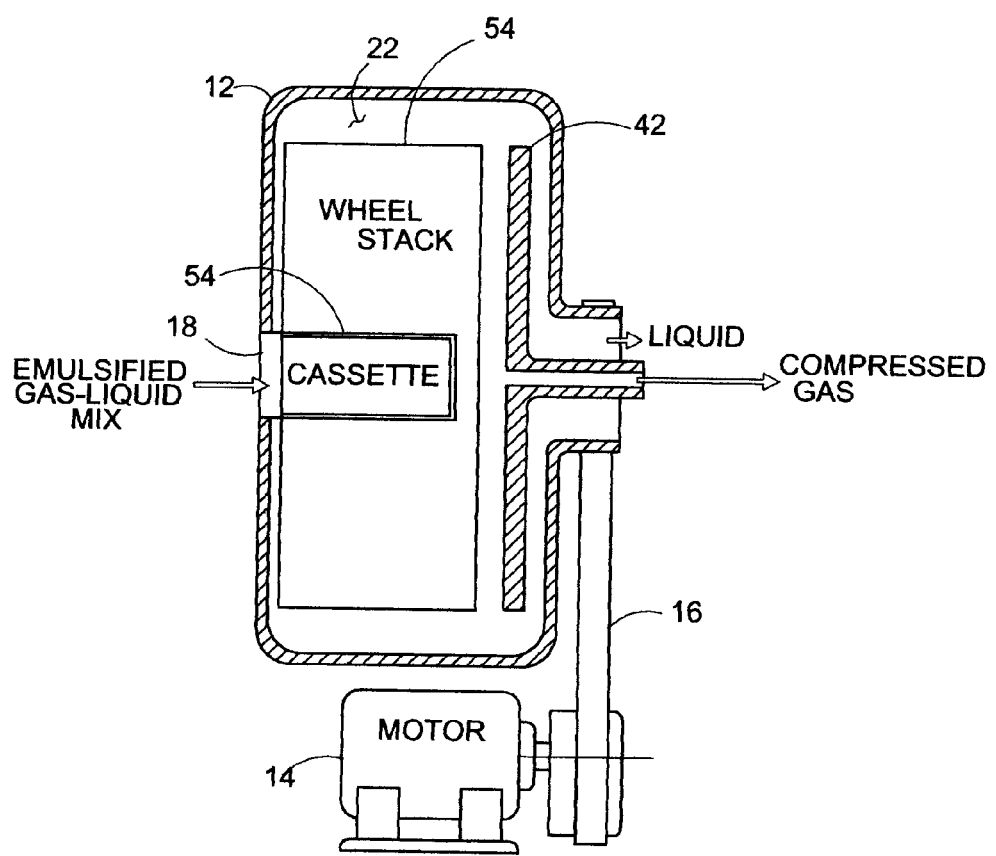
FIG. 6 diagrammatically illustrates a further embodiment of the centrifugal gas compressor wherein the container has an impeller cassette which feeds gas-liquid mixture into capillary tubes formed in discs and wherein the discs are coaxially stacked along the container's axis of rotation as a wheel stack.

FIG. 6 shows another embodiment of the present invention. A wheel stack 54 contains a plurality of discs and each disc defines and carries a plurality of micro-channel capillary tubes as described later. The terminal ends of each capillary tube are open to annular space 22. Therefore liquid and the entrained compressed gas accumulate in annular space 22 when the container 12 is rotated. In order to create an emulsion of the gas in the liquid in the radially inner cavity, and also enhance the quick formation of bubbles in the capillary tube, an impeller formed as a cassette 56 is placed in the radially interior inboard space of centrifugal gas compressor 12. The cassette impeller is an emulsification device. The cassette is an impeller because the impeller causes further break up and mixture of bubbles in the radially inboard cavity of the gas compressor.

Figure 7:
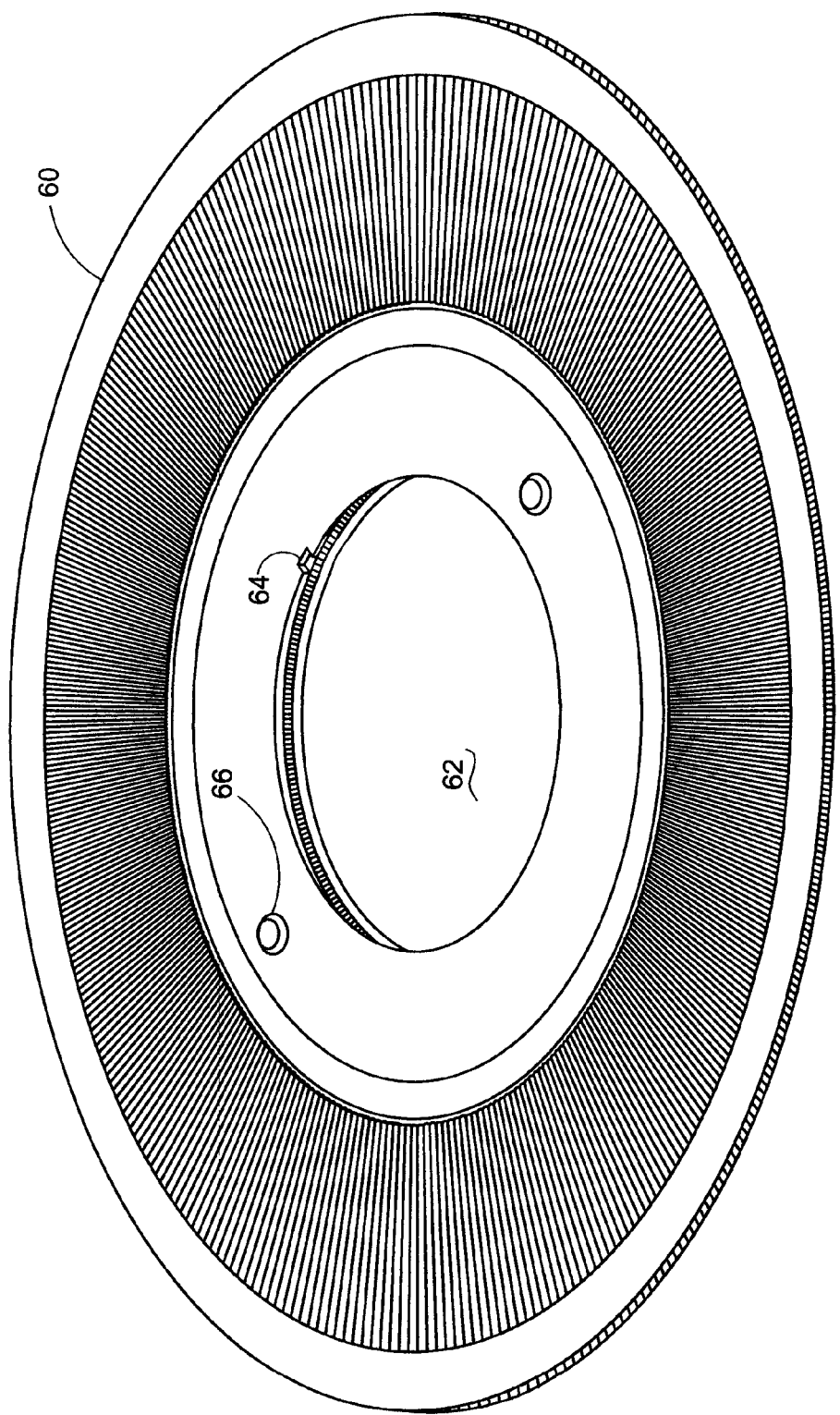
FIG. 7 diagrammatically illustrates a wheel or disc having a plurality of radially disposed capillary passages or tubes.

FIG. 7 diagrammatically illustrates a wheel or disc 60 that has a plurality of radially disposed capillary tubes. Each tube forms a capillary passage there through. Radially interior space 62 accepts an impeller cassette or other emulsification device which is keyed to the key way 64 in the wheel formed by the discs. A plurality of discs 60 are stacked one atop another by key 66 that coacts with a key way in the adjacent disc, not shown in FIG. 7. The capillaries are substantially radially disposed in the disc. The inboard capillary ends may be axially displaced with respect to each other and the outboard capillary ends may be in a single plane at the periphery of the disc. This slight axial twist is needed for inlet spatial orientation on the impeller.

Figure 8:
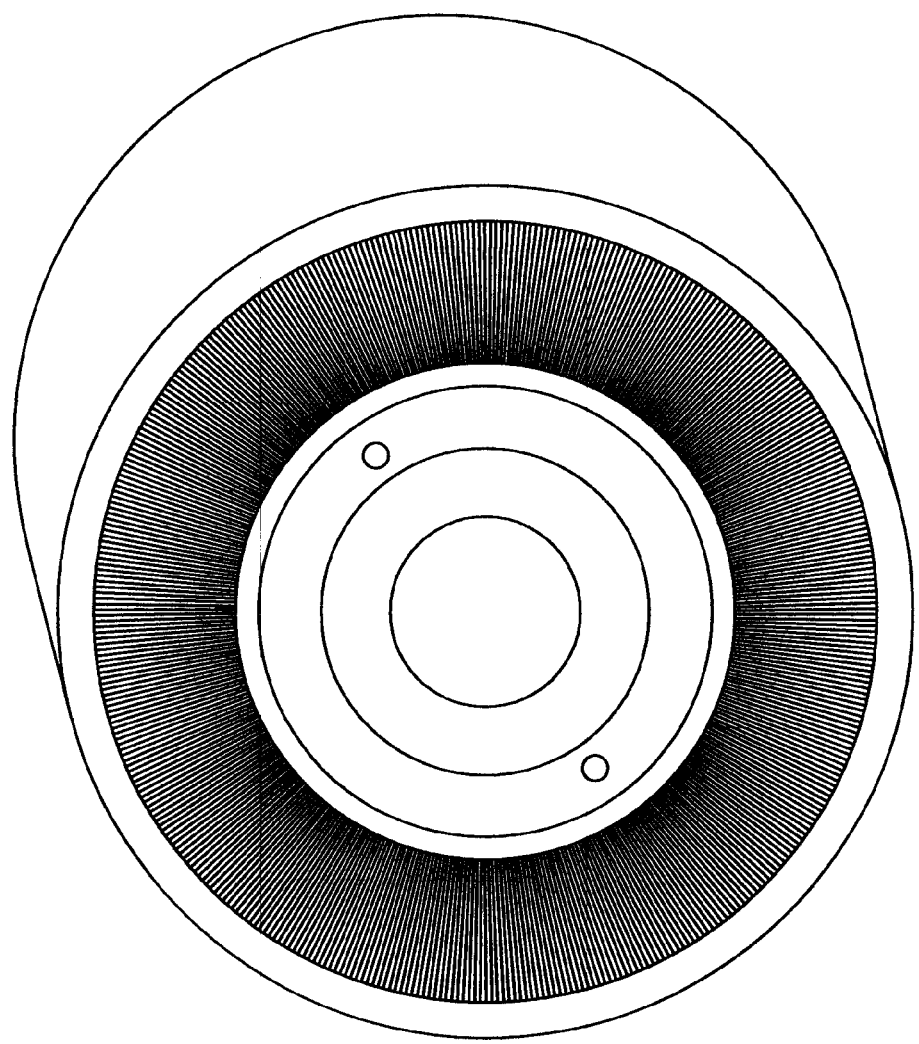
FIG. 8 diagrammatically shows a stack of wheels (discs), each disc defines a number of radial capillary tubes.
Figure 9:
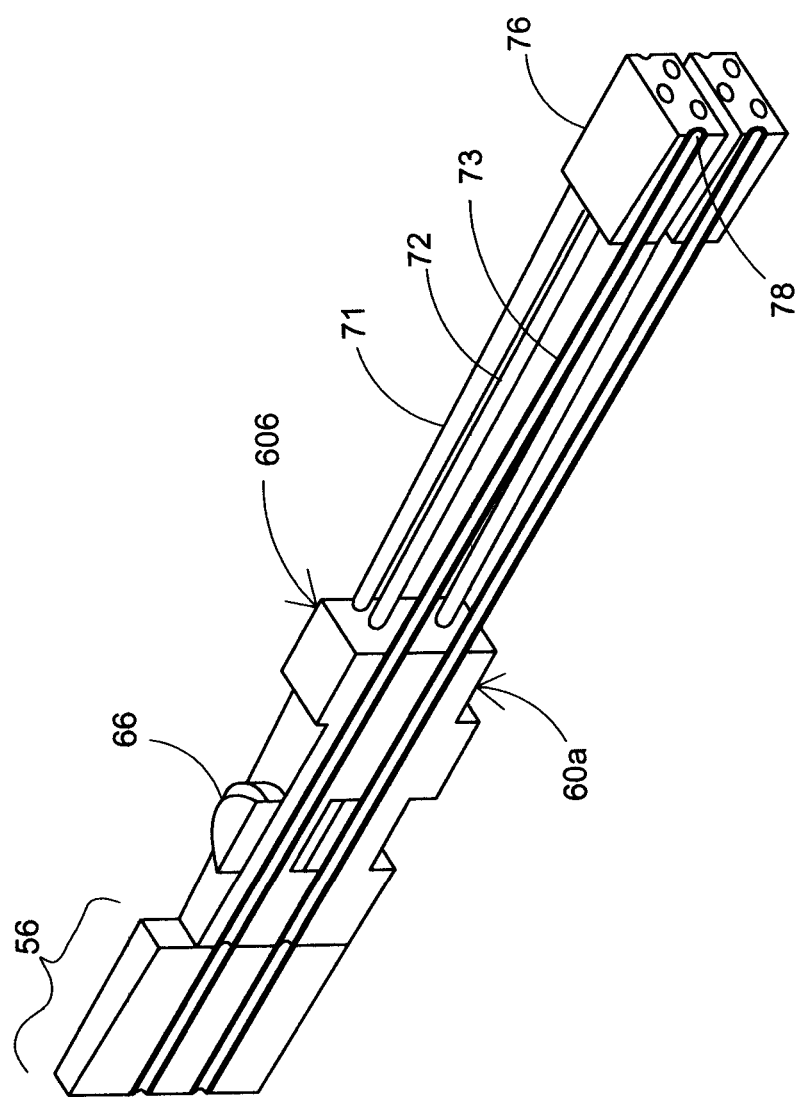
FIG. 9 diagrammatically illustrates a small arcuate segment (about 2-3 degrees) of two wheels or discs and the radial capillary tubes or passages in the discs.

FIG. 8 shows a plurality of discs forming a wheel stack 54. FIG. 9 shows an arcuate slice of approximately 2-3 degrees of the disc and shows two arcuate slices of two stacked discs. In the illustration of FIG. 9, three capillary tubes 71, 72, 73 extend from a radially inboard rim 60*b* to a radially outboard rim 76 of the disc. The terminal outboard end 78 of capillary tube 73 is shown in FIG. 9. At a radially inboard region, a key 66 coacts with a key way in the next adjacent disc. The lower disc in FIG. 9 has a key which coacts in the key way in the upper disc in FIG. 9. At the radially inboard end, the impeller cassette 56 is diagrammatically illustrated. Preferably, the capillary disc tubes are centrally located in the rotating container, that is, the wheel is in an axial midpoint of the compressor. The gas separation chamber is axially spaced from the stacked capillary tubes which form the wheel.

Tests have been run with air and water. These tests establish the operational advantages of the present invention. However, many types of gas may be entrained in different liquids and may be subject to compression in the centrifugal gas compressors discussed herein.

Figure 10A:
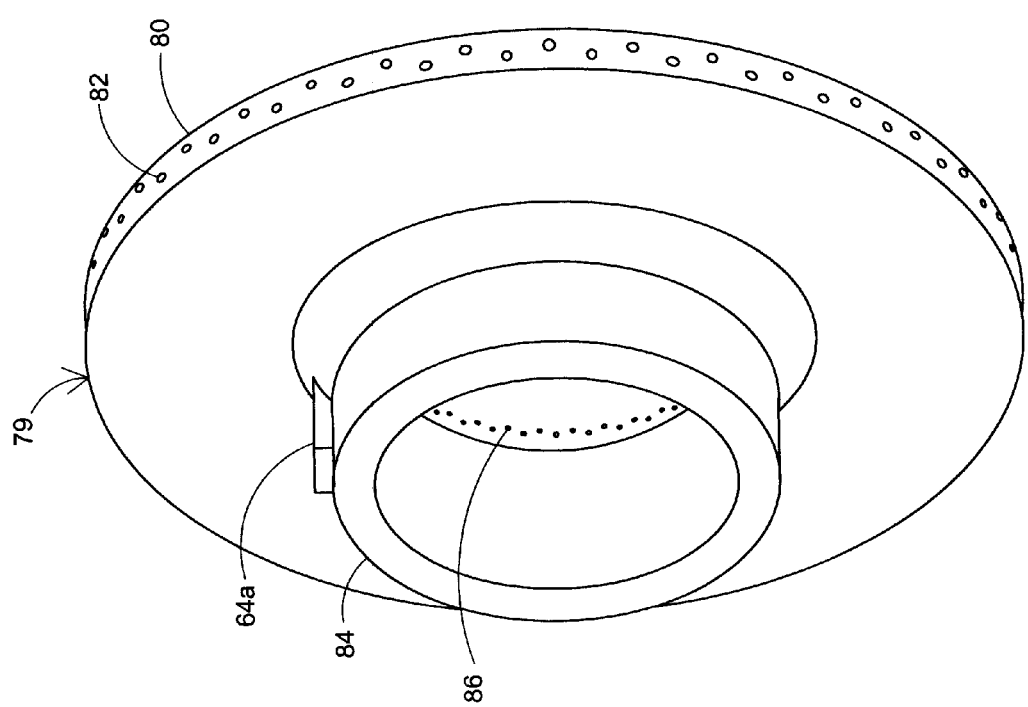
FIGS. 10A and 10B diagrammatically illustrate a small diameter compressor (FIGS. 6 to 9 showing a large diameter compressor) (FIG. 10A not showing an impeller (or emulsification device) which is radially inboard the compressor disc in FIG. 10A, the impeller feeding gas-liquid mixture into the capillary tubes or passages of the compressor disc in FIG. 10A.
Figure 10B:
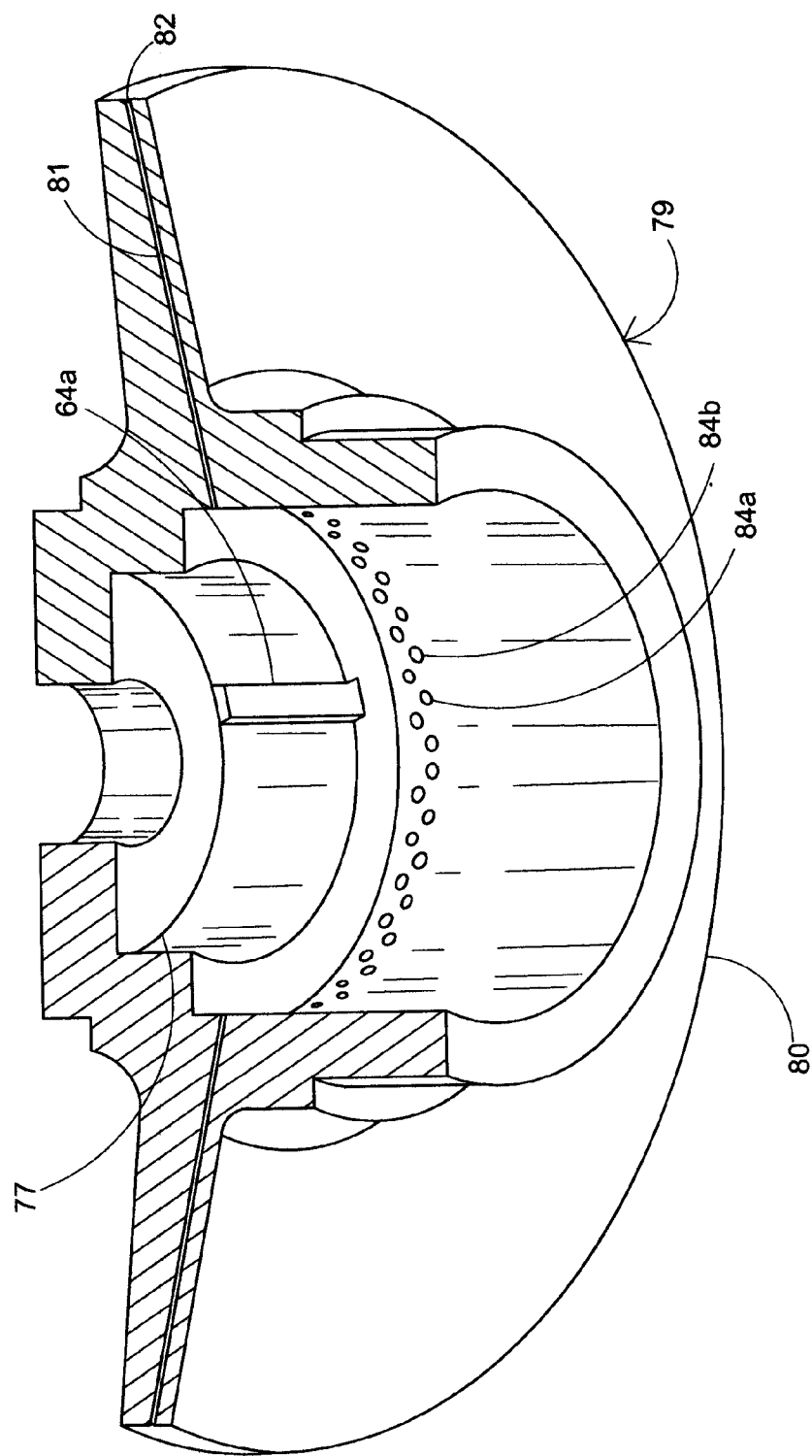

FIGS. 6, 7, 8 and 9 show a relatively large diameter compressor disc or capillary tube/passage device (about 16 inches (nearly 40 cm) and a radial span for the tubes/passages of about 6 inches, inclusive of the emulsification unit (about 15 cm)). FIGS. 10A and 10B show a small compressor disc (about 5-6 inches in diameter (nearly 13 cm) and a radial span for the tubes/passages of about 2 inches (about 5 cm)). The large diameter compressor disc has about 7800 capillaries and the smaller disc has about 72 capillaries.

FIGS. 10A and 10B diagrammatically show another compressor disc (the emulsification unit or device being removed) for the present invention. The compressor disc 79 is disposed in the rotating container. In FIG. 10A, the radially outboard ends of capillary tubes or passages 82 are open to the compressed gas collection space in the rotating device. Radially outboard edge 80 of the disc is in the collection space.

An impeller (not shown in FIG. 10A) defines capillary inlet channels which are radially aligned with the radial capillaries 82 in the disc 79 in FIG. 10A. Alignment is substantially along the centerlines of the channels and capillary passages. The impeller is mounted in the radially inboard cavity 86. Air and water enters the capillary passages at inboard end of these radial passages established by the impeller. Key 64*a* on into a complementary key way of the next disc. In FIG. 8, a simple impeller has been mounted and shown keyed into the wheel 54.

FIG. 10B shows the disc 79 with an impeller 77 keyed to the disc. The impeller has capillary inlet channels which are radially aligned with the radial capillaries 81 in the disc terminating in an open end 82. The inner diameters of the capillary inlet channels are substantially the same as the inner diameters of the capillary tubes to create bubble entrainment and unidirectional flow radially outward to terminal ends 82. It is important that the interior or inner diameter of the capillary passage that extends radially from the radially inboard portions of the centrifugal gas compressor to the annular container space be nearly uniform along its longitudinal extent. Other capillaries 84*a*, 84*b* are shown.

Figure 11A:
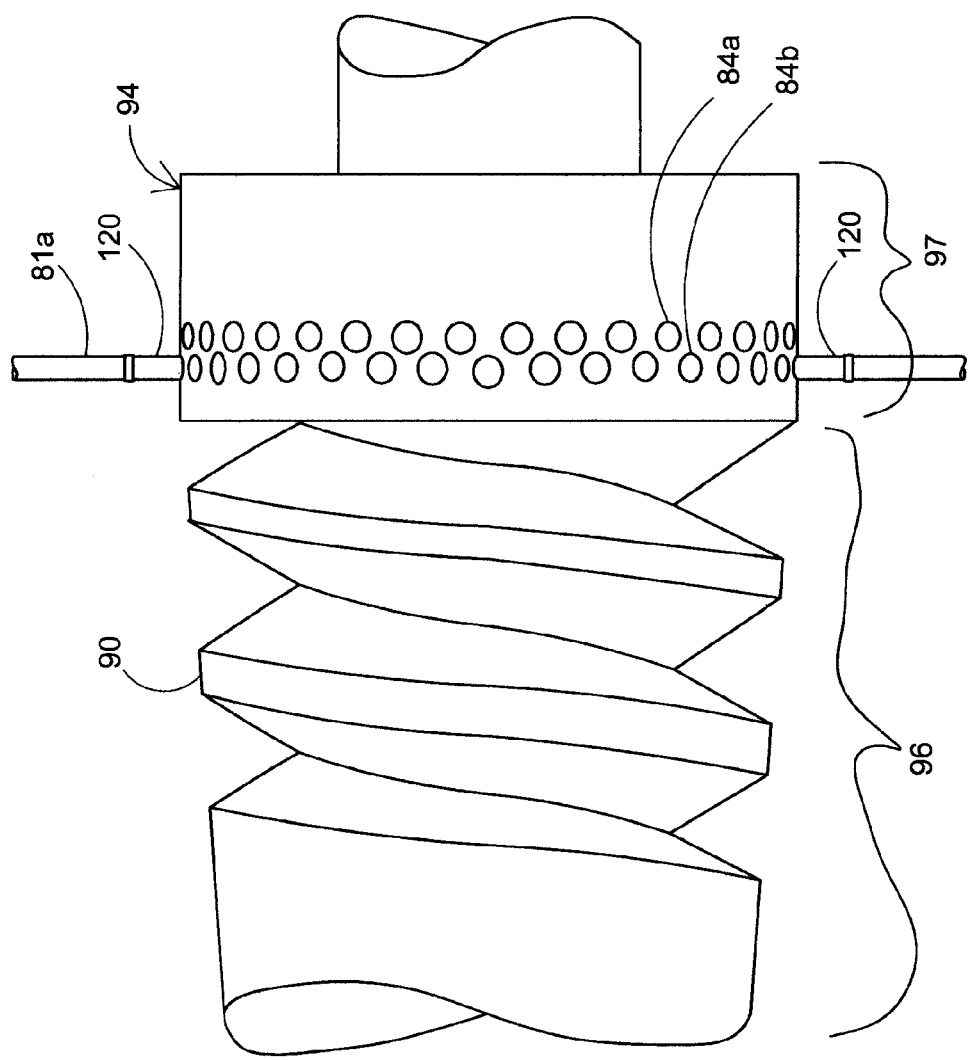
FIGS. 11A and 11B diagrammatically illustrate an impeller with a vortex generator and capillary inlet channels (an emulsification device), the inlet channels lead to the radially disposed capillary passages or tubes.
Figure 11B:
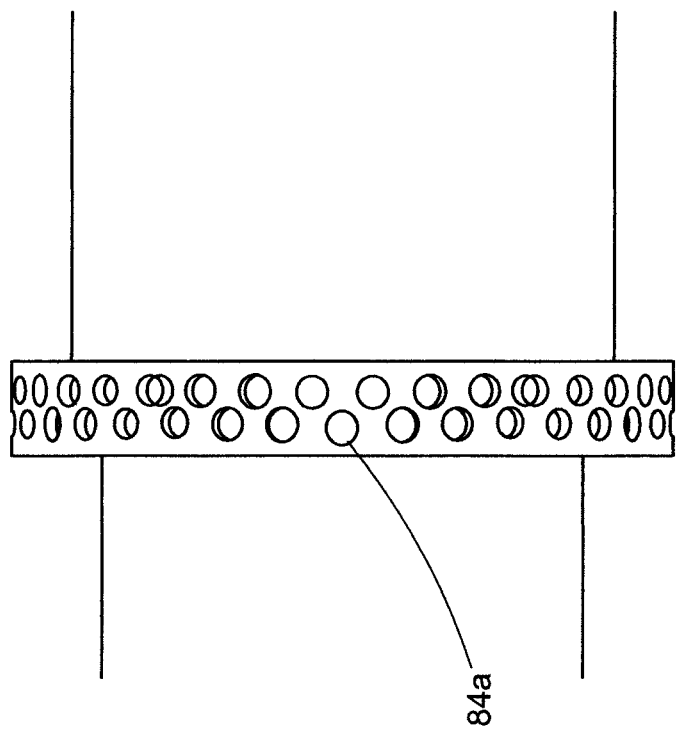

FIGS. 11A and 11B diagrammatically illustrate an emulsifier device as an impeller. The emulsifier units can be fit into the compressor disc shown in FIG. 10A. Modified emulsifier units can be used in the large discs in FIGS. 7-9. Impeller 94 has radial capillary passages 84*a*, 84*b* which are fluidly coupled to capillary tubes 81*b* and 81*a*. Additionally, at a different axial location 96, impeller 94 forms and defines a vortex generator 90. The vortex generator is an auger shaped device, sometimes called an inducer, with the primary goal of auguring the gas and the liquid into an emulsified mixture which is fed into the capillary inlets or intake openings. In the illustrated embodiment of FIG. 11A, the liquid and/or gas enters to the left and the vortex generator or screw type fins cause the gas-liquid mixture to rotate thereby causing further mixing, gas bubble breakup and forcing the gas to stay mixed (emulsified) in the liquid. When the liquid enters axially region 97 of the impeller, the gas-liquid mixture enters the radially inboard inlets of the capillary inlet channels or passages 120 and travels radially outward to capillaries 81*a*, 81*b* due to the high centrifugal force caused by the rotating container. As explained earlier, the centrifugal force of the liquid slugs between each gas bubble is greater than the buoyant force caused by the entrained bubble in the tube and therefore the gas intermediate the liquid slugs is caused to compress as the gas bubbles move radially outboard (unidirectionally) until the gas entrained by the liquid enters the container annular space 22 shown in FIGS. 1, 2, 4 and 6.

FIG. 11B shows that the radial passage 84*a* is normal to the axis of rotation of the container.

Figure 12:
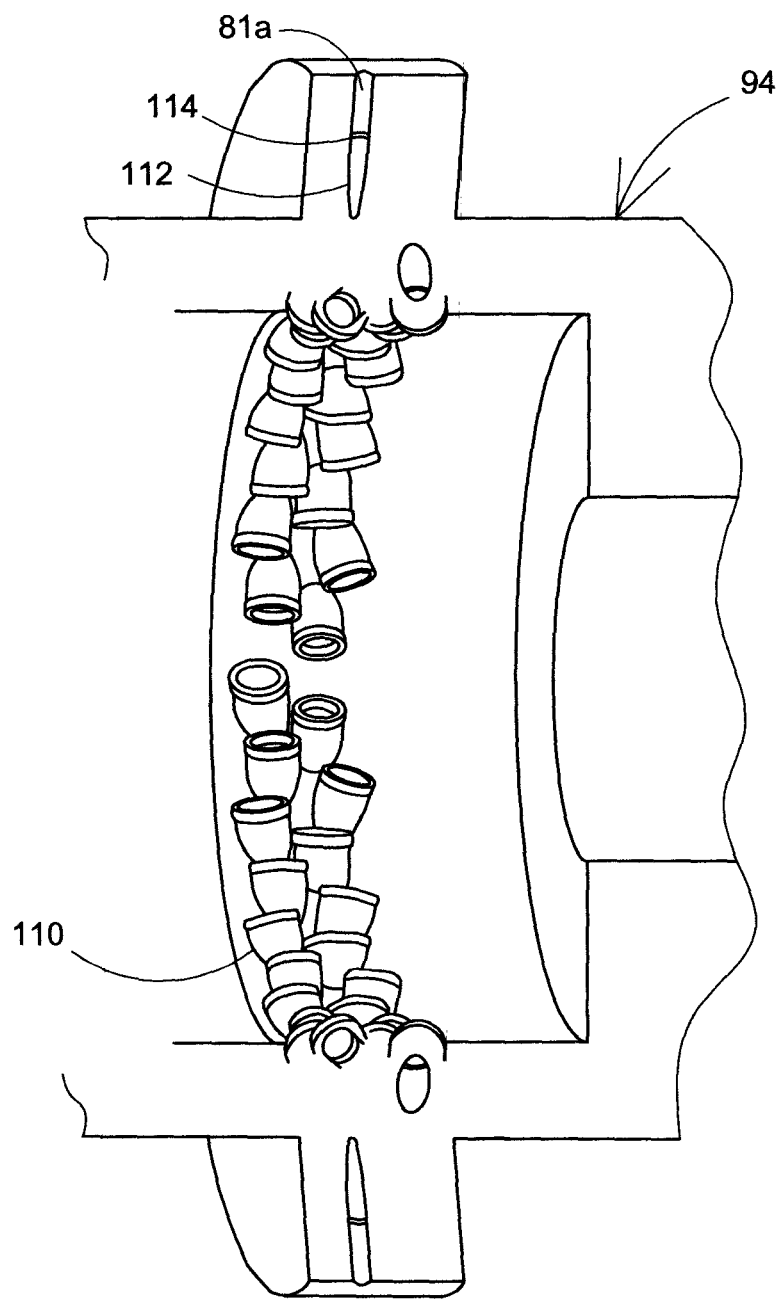
FIG. 12 diagrammatically illustrates an impeller (an emulsification device) with capillary inlet nozzles at a tangential angle with respect to the axis of rotation of the container.

FIG. 12 shows a different impeller 94 or emulsification device wherein the inlet to the capillary tubes is at an angle and is tangential to the axial center line of rotation of the container. Tangential nozzle 110 is at a tangent rather than being normal (perpendicular) to the axis of rotation as shown in earlier FIGS. 11A, 11B. Preferably, the nozzle openings face the direction of flow of the liquid-gas mixture subject to inducer or the vortex generator (not shown). As explained earlier, several different structures form the radially inboard portions of the capillary. In FIG. 12, a radial channel 112 is radially inboard compared to radial capillary tube 81a. Tube 81a is joined or coupled to tube 112 at joint 114.

Figure 13A:
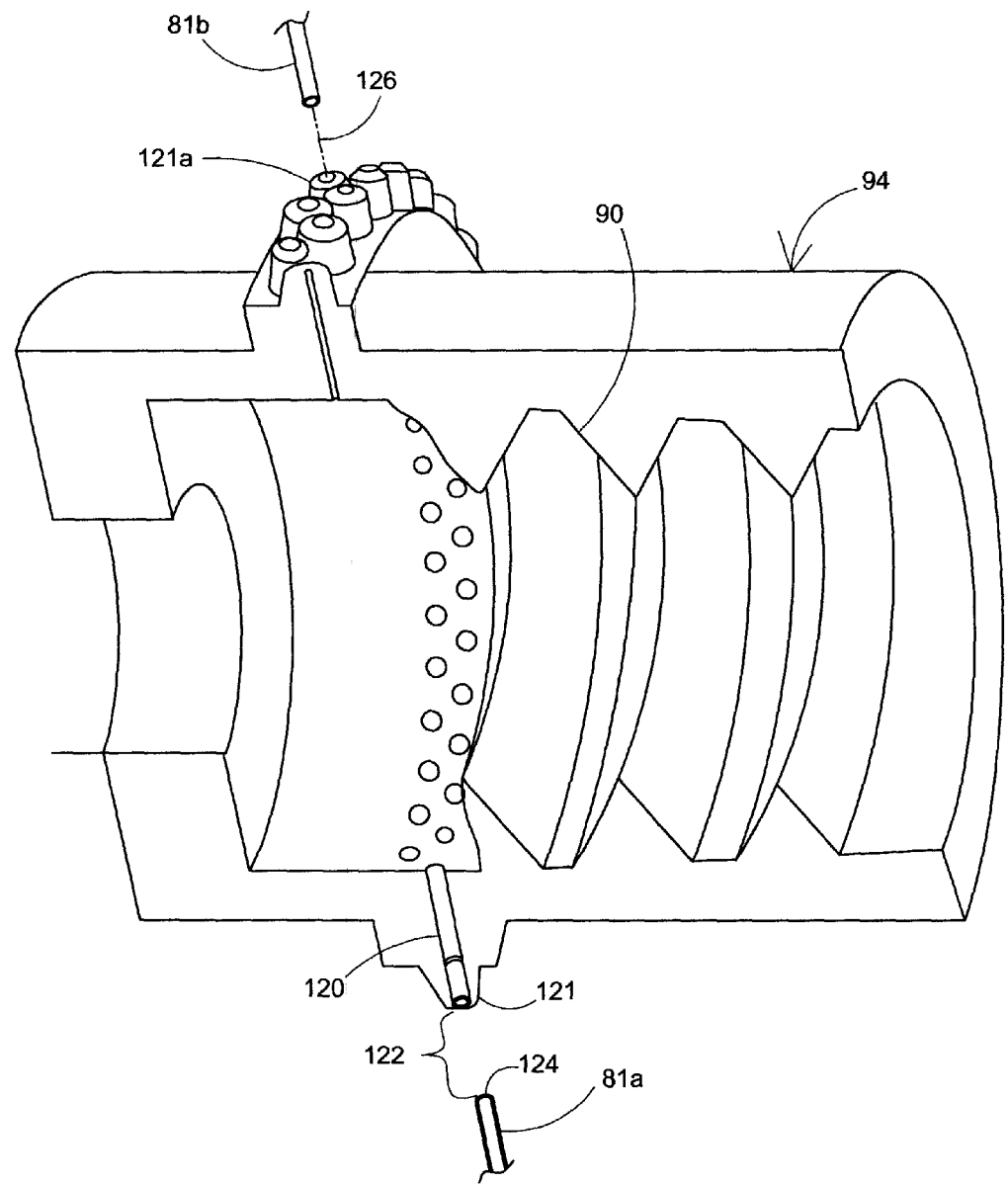
FIGS. 13A, B and C diagrammatically illustrate a venturi jet (a further emulsification device) interposed between the first capillary channel and the second capillary channel wherein the secondary capillary channel leads to the radially disposed capillary passages.
Figure 13B:
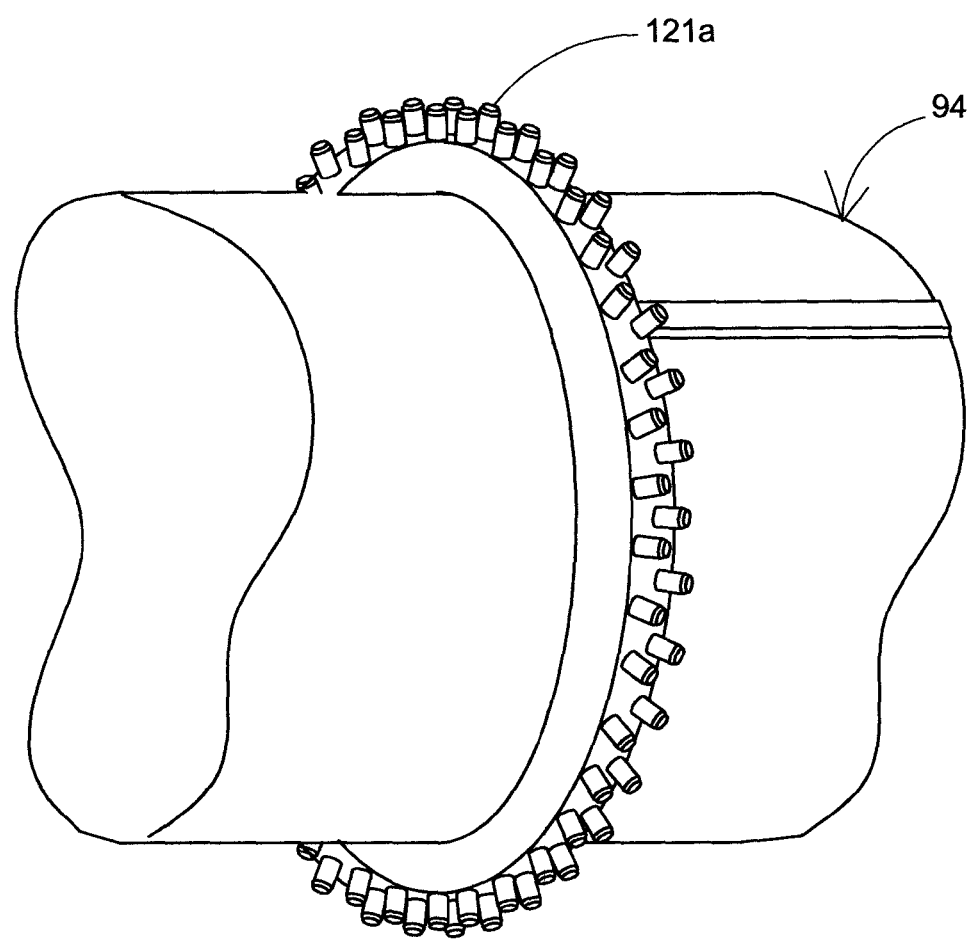
Figure 13C:
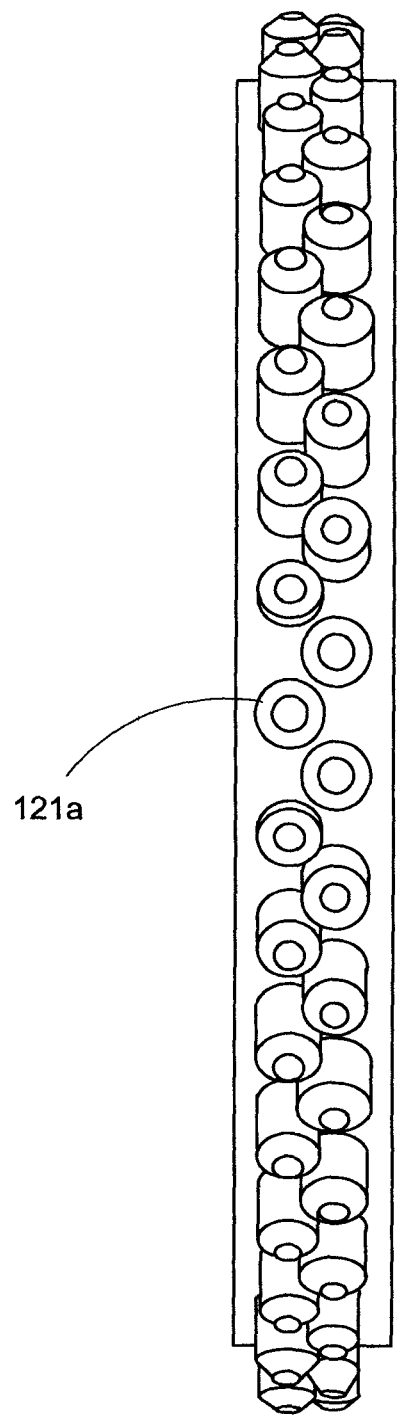

FIGS. 13A, 13B and 13C diagrammatically illustrate another emulsification device impeller 94. In FIG. 13A, impeller 94 has an input to the right of the figure and vortex generator 90 causes the liquid to rotate as it travels from right to left in FIG. 13A. The axial position of the capillary inlet channels or passages of the emulsification unit is beyond (coaxial, but axially displaced from) the vortex generator (the vortex generator being intermediate the inlet 18 of the gas compressor as compared to the axial location of the radial passages defined by the discs).

In the illustrated embodiment of FIGS. 13A, 13B and 13C, the emulsification device is an impeller that forms a venturi jet by a two-piece capillary inlet channel. A first inboard capillary channel 120 carries liquid and is disassociated or spaced from a second, centerline aligned capillary channel 81a. The disassociated radial space 122 between the channels 120, 81a has a venturi effect on gas in the space. When a liquid jet passes through space gap 122, gas is captured by the liquid jet. The radial passages have a radial inboard channel 120 which terminates in a nozzle 121. See also nozzle 121a. A gap or space 122 is established between nozzle 121 and the radially inboard opening 124 of the capillary tube 81a. In this manner, a venturi jet is formed by the fast moving liquid passing through the gas filled space 122. Liquid that leaves nozzle 121, 121a forces gas in the gap 122, 126 to further mix with the jet of liquid prior to entrance into capillary tube nozzle 124. Capillary tube nozzle 124 leads to radial capillary 81a. In this embodiment, some liquid is in an inboard cavity of the impeller. The impeller hub defines the first inboard capillary channels 120 and the impeller has a radially outer annular space (see gap 122) which is filled with gas. The venturi jet from the first capillary channel 120 exits the nozzle 121, passes through the impeller's radially outer annular space 122, pulls gas into the venturi jet liquid and the jet flow enters radially inboard opening 124 of the capillary tube 81a. The centerline of tubes 120, 121, 124 and 81a are aligned as shown at centerline 126 near tube 81b. The capillary tube 81a, 81b is the second capillary inlet channel which in turn leads to and is coupled to the radially disposed capillary passages. The longitudinal centerlines of first inboard capillary channel 120 and the second capillary channels 81a and the radially disposed capillary passages are aligned. See centerline 126.

FIG. 13B shows impeller 94 and the nozzle 121a. FIG. 13C shows that nozzle 121a is at a perpendicular angle to the axial center line of rotation of the container.

Figure 14:
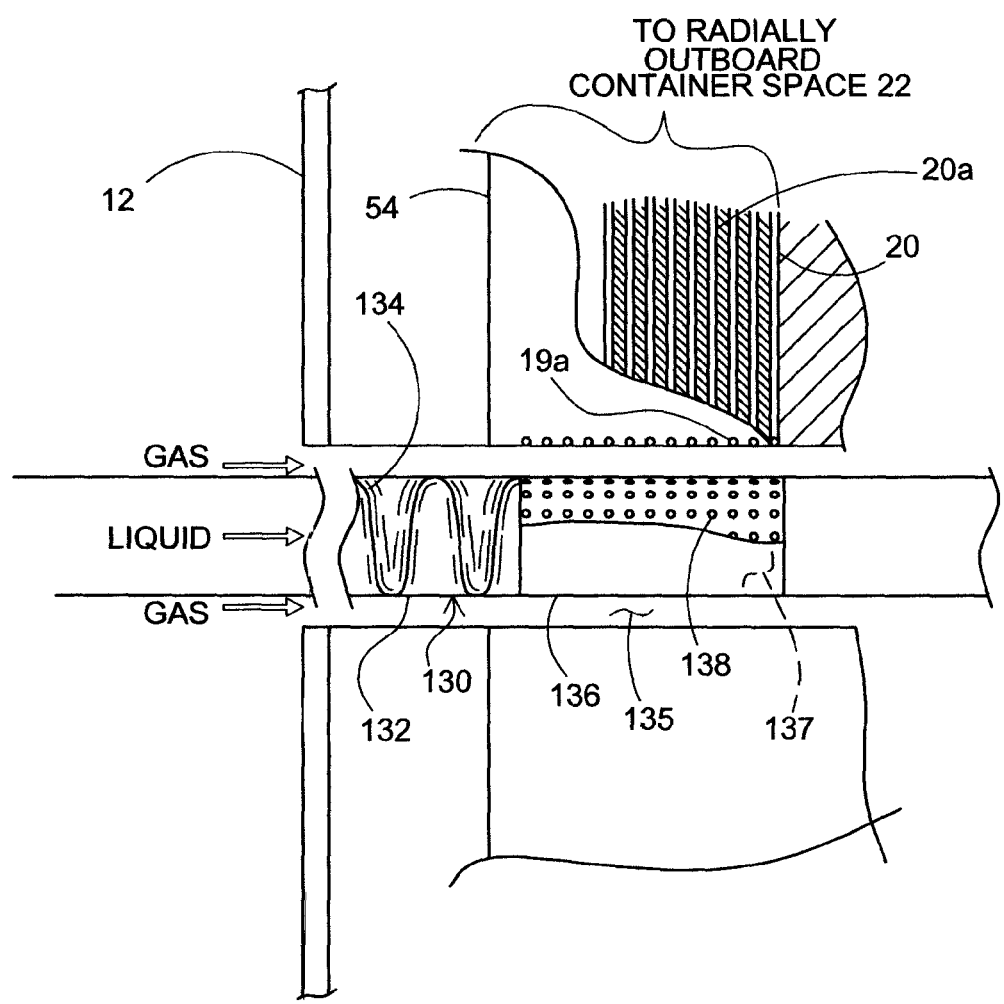
FIG. 14 diagrammatically illustrates an emulsification device with an upstream vortex generator and ejector jet sets or venturi injector sets wherein liquid from a radially inboard fed cavity is ejected into an air or gas space (or gap) and then forced into the diagrammatically illustrated inboard terminal ends of the capillaries.

FIG. 14 diagrammatically illustrates an emulsion device 130 with an upstream vortex generator 132 and ejector jet set or venturi injector set generally configured downstream of vortex generator 132 and in the radially inboard region 17 (FIG. 1) of the gas compressor. The ejector jet set or venturi injector set is coaxial with respect to the vortex generator. However, the vortex generator could be radially inboard of the ejector jet set or venturi injector set. The ejector jet set or venturi injector set in the illustrated embodiment includes a structure 136 which is coaxial with vortex generator 132. The venturi injector set may include a system shown in FIG. 13A or other types of ejectors which are sometimes used in other fluid systems similar to compressors. The ejector jet or venturi injector is supplied with liquid which is fed into radially inboard space 137 (see dashed lines in FIG. 14) and the liquid is expressed or ejected from one of the multiplicity of holes 138 which form ejector or venturi device 136. A gas is fed into intermediate radially cavity 135. When the liquid is ejected from the ejector/injector 136, it mixes in the air in the annular cavity 135 and the emulsified air-gas mixture is fed into the radially inboard ports of the capillary tubes or passages. See radially inboard port 19a of the capillary tube 20a. The venturi device 136 injects emulsified gas-liquid into the inboard ports of the capillaries.

FIG. 14 shows a wheel 54 having a plurality of discs and each disc includes several micro-channel capillary passages 20, 20a. The air-water or gas-liquid mix is forced into the inboard terminal ends 19a of the capillaries 20a, 20 by the emulsification device.

Figure 15A:
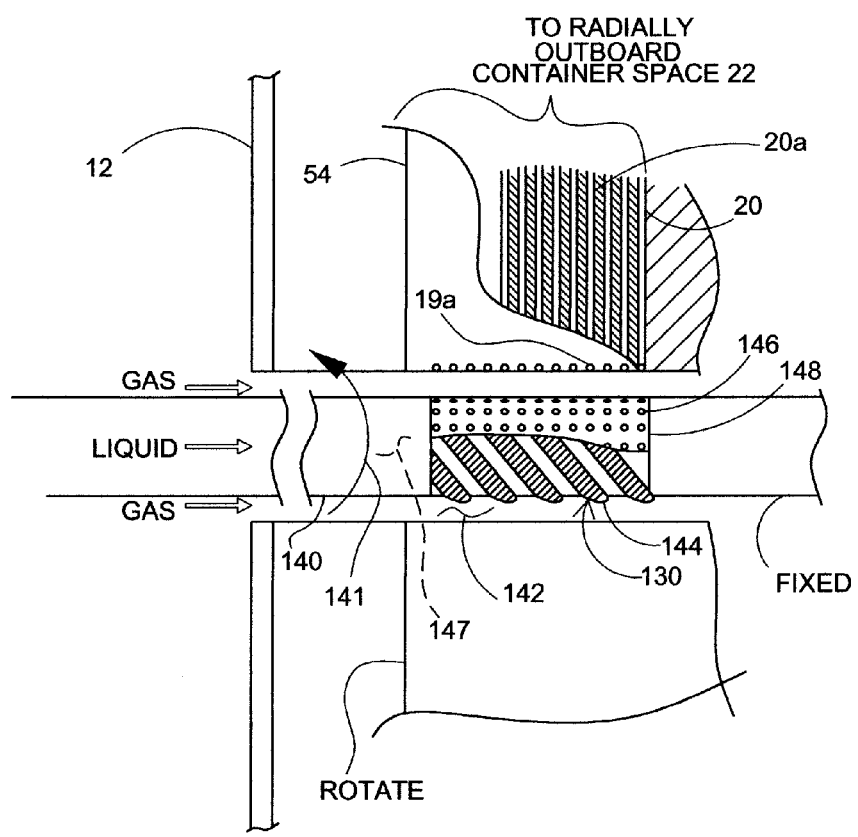
FIGS. 15A and 15B diagrammatically illustrate another emulsification device with a double wall screen (the outer screen wall of the double wall screen in FIG. 15B formed as a vortex generator with spiral, protruding screen wave segments, see diagrammatic cross-section with protruding screen wave segments in FIG. 15B)
Figure 15B:
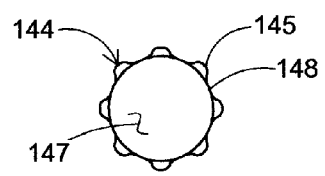

FIGS. 15A and 15B diagrammatically illustrate another emulsification device 130. The emulsification device 130 is fixed in a manner of a stator 140 with container 12 rotating in direction 141 about the fixed stator 140. Liquid is introduced into the radially inboard portion 147 of stator 140. Gas is fed into annular cavity 142.

The emulsification device 130 in the illustrated embodiment in FIG. 15A includes a double wall screen which is fed with liquid from an inboard cavity 147 (see dashed lines) and which mixes with the gas in annular cavity 142. The double wall screen of emulsification device 130 includes a radially inboard screen 148 having a plurality of holes or apertures 146 therein. The outer wall screen or aperture defining wall 144 is further formed as both a shearing structure and as a vortex generator. The outer aperture defining wall 144 has waves or protruding screen-wall segments 144 separated by depressed screen-wall segments 147.

FIG. 15B shows interior liquid space 147 in the emulsification device and shows the inside screen-wall 148 and the outside screen-wall 144. The high points or raised regions of the outside screen-wall 145 are intermediate the lower level or depressed screen-wall segments 147. The outer screen-wall segments define a screw-like vortex generator.

Figure 15C:
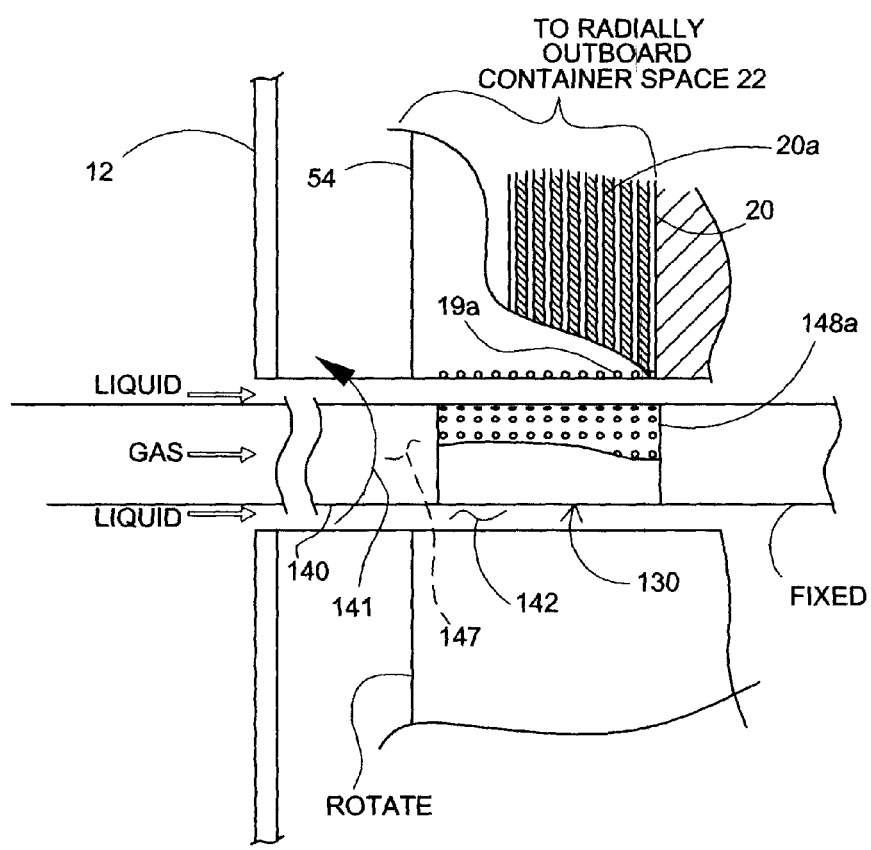
FIG. 15C diagrammatically illustrates an emulsification device wherein gas is fed into a radially inboard space, in a fixed stator, and a screen of sintered metal or other material causes an emulsification of the gas and the liquid fed into an annular space about the sintered screen and whereby the emulsified gas-liquid mixture is fed into the radially inboard ports of the capillary tubes.

FIG. 15C diagrammatically illustrates another emulsification device 130. The emulsification device 130 is fixed in a manner of a stator 140 with container 12 rotating in direction 141 about the fixed stator 140. Gas is introduced into the radially inboard portion 147 of stator 140. Liquid is fed into annular cavity 142.

The emulsification device 130 in the embodiment in FIG. 15C includes a single wall with small fine sub-micron passages illustrated as micro-screen 148a. A sintered metal screen may be used to form these micro-passages. The sintered wall screen 148a is fed with gas from an inboard cavity 147 (see dashed lines) and which mixes with the liquid in annular cavity 142. The sintered wall screen 148a of emulsification device 130 includes a plurality of micro-channels therein. The dimensional size of these micro-channels in the sintered screen material of FIG. 15C is greatly exaggerated compared to the screen in FIG. 15A.

The emulsification devices shown in FIGS. 11A, 12, 13A, 14 and 15A show the various types of emulsification devices that can be used to finally divide and mix the gas with the liquid. It should be noted that various combinations of these emulsification devices may be altered in order to achieve the emulsified gas-liquid mixture which is then fed into the radially inboard portion of the micro-channel capillary tubes. A mixed phase emulsion of liquid and gas is created through mechanical shearing of a liquid stream or pressure jet induction and introduced into the inboard end of a collection of capillary tubes spinning in a radial device and collected at the outboard end of the capillary tubes.

FIG. 16 diagrammatically illustrates tangential capillaries 20 which lead in a radial sense from capillary inlet port 19 (near the radially inboard cavity 17 of the compressor) to radially outer port 21 at annular cavity 22. The capillary tubes are generally radially disposed in the spinning container. Capillary tubes or passages 20 are formed in discs which are mounted in wheel 54. A smaller disc may be employed (see FIG. 10A). Container 12 rotates about axis of rotation 150 in direction 151. In general, capillaries 20 in FIG. 16 are at an approximately 90 degree angle with respect to the axis of rotation.

FIG. 17 diagrammatically illustrates continuously curved capillaries 20 which radially lead from inboard port 19 to annular compressed gas collection space 22 and output port 21. As shown in FIG. 17, capillary tubes 20 form a backward swept curve or swirl with respect to the axis of rotation 150 and direction 151. The tangential tubes in FIG. 16 can also be continuously curved in the direction of rotational flow (the flow in the radially inboard cavity 17 (FIG. 1). This continuous curve in the direction of rotational flow is sometimes called a forward swept channel. The radially inboard segments of the plurality of capillary tubes or passages, in an enhanced embodiment, are configured as tangential entry passages which are substantially similar to the tangential orientation in FIG. 16.

Therefore as shown in FIGS. 1, 16 and 17, the capillaries need not be directly radial with respect to the axial centerline of the compressor. The centrifugal force acting on the intermediate liquid, separated by the gas bubbles in the capillary tubes, is moved in unidirectionally towards the radial outermost collection cavity in the compressor. The tubes or capillary passages can take various routes without compromising the unidirectional flow of the gas bubbles entrained between the intermediate liquid slugs.

To achieve high efficiency, the inner diameter of the capillaries is uniform from the radially inner cavity where the gas-liquid mixture is fed into the tubes, through the entire longitudinal extent of the capillaries. This uniformity applies to the nozzles, inboard channels and radially capillary tubes. The uniform diameter causes bubble creation and maintains bubble integrity and gas compression throughout the longitudinal extent of the capillaries.

The claims appended hereto are meant to cover modifications and changes within the scope and spirit of the present invention.

What is claimed is:

1. A method for compressing a gas entrained in a liquid comprising:
providing a container rotatable about an axis with a plurality of capillary passages fixed in the container which lead radially to radially outboard ends terminating in a substantially annular container space;
ejecting a plurality of jets of liquid through a gap filled with gas, each liquid jet creating a gas-liquid emulsion which is delivered to a corresponding capillary passage, each said liquid jet being continuously radially aligned with a respective input port of each said capillary passage, said emulsion created by a venturi effect in said gap, the introduction of the gas-liquid emulsion into radially inboard ends of said plurality of capillary passages promotes capillary action on said liquid in said capillary passages;
rotating said container causing formation of gas bubbles in said capillary passages and compressing said gas bubbles towards the radially outboard ends of said capillary passages;
collecting liquid and entrained compressed gas bubbles in said annular container space; and drawing off compressed gas released from bubbles buoyantly emerging from the gas-liquid mixture in said annular container space.

2. A method for compressing gas as claimed in claim 1 wherein said plurality of capillary passages form compressed gas bubbles in one of:
a plurality of elongated substantially radial capillary passages leading radially to said outboard ends;
a plurality of elongated substantially tangential capillary passages leading radially to said outboard ends; and
a plurality of elongated substantially continuously curved capillary passages leading radially to said outboard ends.

3. A method for compressing gas as claimed in claim 1 including drawing off said compressed gas at a radially inboard gas portal and drawing off liquid which has passed through said plurality of capillary passages near a radially inboard liquid discharge portal.

4. A method for compressing gas as claimed in claim 1 wherein each said capillary passage is substantially uniform in size throughout its radial extent which causes formation of gas bubbles near radially inboard portions of said capillary passages.

5. A method for compressing gas as claimed in claim 1 wherein a liquid-gas mixture is created prior to introduction into said capillary passages by creating said liquid-gas mixture in a radially inboard cavity which is radially inboard said plurality of jets.

6. A method for compressing gas as claimed in claim 1 including creating a vortex in said liquid prior to ejecting said jets of liquid into said plurality of capillary passages.

7. A method for compressing gas as claimed in claim 1 wherein said capillary passages form micro-channels for said emulsion.

8. A method for compressing gas as claimed in claim 1 wherein the compression of gas bubbles is an isothermal process by centrifugal force which overcomes the buoyant force acting on the bubbles in the capillary tubes.

9. A method for compressing a gas and a liquid fed into radially inboard regions of a rotating container comprising:
providing, in said container, a plurality of capillary passages fixed in the container which lead radially to radially outboard ends terminating in a substantially annular container space;
ejecting a plurality of jets of liquid through a gap filled with gas, each liquid jet creating a gas-liquid emulsion which is delivered to a corresponding capillary passage, each said liquid jet being continuously radially aligned with a respective input port of each said capillary passage, said emulsion created by a venturi effect in said gap, the introduction of the gas-liquid emulsion into radially inboard ends of said plurality of capillary passages promotes capillary action on said liquid in said capillary passages;
isothermally compressing gas bubbles captured in said capillary passages along the radial extent of said capillary passages by centrifugal force;
collecting the output from said capillary passages in the annular container space which includes the compressed gas bubbles; and,
drawing off said compressed gas from said annular container space.

10. A method for compressing gas as claimed in claim 9 wherein said plurality of capillary passages form compressed gas bubbles in one of:
a plurality of elongated substantially radial capillary passages leading radially to said outboard ends;

a plurality of elongated substantially tangential capillary passages leading radially to said outboard ends; and a plurality of elongated substantially continuously curved capillary passages leading radially to said outboard ends.

11. A method for compressing gas as claimed in claim 9 including drawing off said compressed gas at a radially inboard gas portal and drawing off liquid which has passed through said plurality of capillary passages near a radially inboard liquid discharge portal.

12. A method for compressing gas as claimed in claim 10 wherein each said capillary passage has substantially uniform in size throughout its longitudinal extent which causes formation of gas bubbles near radially inboard portions of said capillary passages and compression of gas bubbles as the respective gas bubbles move longitudinally through the corresponding capillary passage to said annular container space.

13. A method for compressing gas as claimed in claim 9 wherein said gas and said liquid are independently supplied into said container.

14. A method for compressing gas as claimed in claim 9 including generating a vortex in said liquid before ejecting said jets of liquid into said radially inboard ends of said plurality of capillary passages.

15. A method for compressing gas as claimed in claim 14 including introducing said jets of liquid into said plurality of capillary passages includes introduction via one of: a substantially radial passage from said vortex to said plurality of capillary passages; and a tangential passage from said vortex to said plurality of capillary passages.

16. A method for compressing gas as claimed in claim 9 wherein said capillary passages form micro-channels for said emulsion.

17. A method for compressing gas in a liquid-gas mixture fed into a radially inboard region of a rotating container comprising:

providing in the container a plurality of capillary passages fixed in the container which lead radially to radially outboard ends terminating in a substantially annular container space;

ejecting a plurality of jets of said liquid-gas mixture through a gap filled with gas, each liquid-gas mixture jet creating a gas-liquid emulsion which is delivered to a corresponding capillary passage, each said liquid jet being continuously radially aligned with a respective input port of each said capillary passage, said emulsion created by a venturi effect in said gap, the introduction of the gas-liquid emulsion into radially inboard ends of said plurality of capillary passages promotes capillary action on said liquid in said capillary passages;

compressing gas bubbles in said capillary passages by centrifugal force and forcing the resulting compressed gas bubbles and intermediate liquid into the annular container space; and, collecting compressed gas from the annular container space.

18. A method for compressing gas as claimed in claim 17 wherein the compression of gas bubbles is an isothermal process caused by compression of gas bubbles in said plurality of capillary passages.

19. A method for compressing gas as claimed in claim 18 wherein said isothermal compression occurs in one of:

a plurality of elongated substantially radial capillary passages leading radially to said outboard ends;

a plurality of elongated substantially tangential capillary passages leading radially to said outboard ends; and a plurality of elongated substantially continuously curved capillary passages leading radially to said outboard ends.

20. A method for compressing gas as claimed in claim 17 including drawing off said compressed gas at a radially inboard gas portal and drawing off liquid which has passed through said plurality of capillary passages near a radially inboard liquid discharge portal.

21. A method for compressing gas as claimed in claim 19 wherein each said capillary passage is substantially uniform in size throughout its radial extent which causes formation of gas bubbles near radially inboard portions of said capillary passages.

22. A method for compressing gas as claimed in claim 17 including feeding the liquid-gas mixture into said capillary passages by generating a vortex prior to the ejection of said liquid-gas mixture jets and creating said vortex in a radially inboard cavity which is inboard said radially inboard ends of said plurality of capillary passages.

23. A method for compressing gas as claimed in claim 22 wherein ejecting said liquid-gas jets into said plurality of capillary passages includes introduction via one of: a substantially radial passage from said vortex to said plurality of capillary passages; and a tangential passage from said vortex to said plurality of capillary passages.

24. A method for compressing gas as claimed in claim 17 wherein said capillary passages form micro-channels for said emulsion.

25. A method for compressing gas in a liquid-gas mixture fed into a radially inboard region of a rotating container comprising:

providing in the container a plurality of capillary passages fixed in the container which lead radially to radially outboard ends terminating in a substantially annular container space;

ejecting a plurality of jets of said liquid-gas mixture through a gap filled with gas, each liquid-gas mixture jet creating a gas-liquid emulsion which is delivered to a corresponding capillary passage, each said liquid jet being continuously radially aligned with a respective input port of each said capillary passage, said emulsion created by a venturi effect in said gap, the introduction of the gas-liquid emulsion into radially inboard ends of said plurality of capillary passages promotes capillary action on said gas-liquid emulsion liquid in said capillary passages;

compressing gas bubbles in said capillary passages by centrifugal force by intermediate liquid between the gas bubbles which unidirectionally move to the annular container space; and, collecting compressed gas from the annular container space.

26. A method for compressing gas as claimed in claim 25 wherein the compression of gas bubbles is caused by intermediate liquid slugs which slugs and bubbles move unidirectionally to the annular container space.

27. A method for compressing gas as claimed in claim 26 wherein gas compression occurs in one of:

a plurality of elongated substantially radial capillary passages leading radially to said outboard ends;

a plurality of elongated substantially tangential capillary passages leading radially to said outboard ends; and a plurality of elongated substantially continuously curved capillary passages leading radially to said outboard ends.

28. A method for compressing gas as claimed in claim 25 including drawing off said compressed gas at a radially inboard gas portal and drawing off liquid which has passed through said plurality of capillary passages near a radially inboard liquid discharge portal.

29. A method for compressing gas as claimed in claim 27 wherein each said capillary passage is substantially uniform in size throughout its radial extent which causes formation of gas bubbles near radially inboard portions of said capillary passages.

30. A method for compressing gas as claimed in claim 27 including generating a vortex in said liquid-gas mixture prior to ejecting said liquid-gas jets, said vortex generated in a radially inboard cavity which is inboard said radially inboard ends of said plurality of capillary passages.

31. A method for compressing gas as claimed in claim 30 wherein introducing said liquid-gas mixture into said plurality of capillary passages includes introduction via one of: a substantially radial passage from said vortex to said plurality of capillary passages; and a tangential passage from said vortex to said plurality of capillary passages.

32. A method for compressing gas as claimed in claim 25 wherein said capillary passages form micro-channels for said emulsion.

33. A centrifugal gas compressor fed with a gas and a liquid comprising:
a rotating container rotated by a prime mover about an axis;
said container having a radially inboard cavity and a plurality of capillary passages fixed in the container and having radially inboard ends open to said radially inboard cavity which lead radially to radially outboard ends terminating in a substantially annular container space;
each capillary passage defined by a two-piece capillary channel forming a venturi jet of liquid through a gap filled with gas, each venturi jet creating a gas-liquid emulsion which is fed across the gap to a corresponding capillary channel of a respective capillary passage, said two-piece capillary channel being continuously radially aligned;
emulsion subjected to capillary action as said emulsion passes through said plurality of capillary passages;
the plurality of capillary passages sized such that gas bubbles in said emulsion are trapped between slugs of liquid in said capillary passages due to centrifugal force of the spinning container, said centrifugal force on the liquid slugs being greater than a buoyancy of said gas bubbles in said capillary passage thereby moving said gas bubbles and liquid slugs to said annular container space and causing said gas to compress in the capillary passages;
a gas drain passage from said annular container space for drawing off compressed gas from the annular container space; and
a liquid drain passage from said annular container space for drawing off liquid from the annular container space.

34. A centrifugal gas compressor claimed in claim 33 wherein said plurality of capillary passages are one of:
a plurality of elongated substantially radial capillary passages leading radially to said outboard ends;
a plurality of elongated substantially tangential capillary passages leading radially to said outboard ends; and
a plurality of elongated substantially continuously curved capillary passages leading radially to said outboard ends.

35. A centrifugal gas compressor claimed in claim 34 including a radially inboard gas portal leading to said gas drain passage for said compressed gas and a radially inboard liquid discharge portal leading to said liquid drain passage.

36. A centrifugal gas compressor claimed in claim 33 wherein each said capillary passage is a micro-channel being substantially uniform in its cross-sectional size throughout its longitudinal extent.

37. A centrifugal gas compressor as claimed in claim 33 including a vortex generator radially inboard of said two-piece capillary channel.

38. A centrifugal gas compressor as claimed in claim 33 including a vortex generator disposed radially inboard of said plurality of capillary passages, said vortex generator receiving said liquid from a compressor input port and feeding said liquid into said radially inboard ends of said plurality of capillary passages.

39. A centrifugal gas compressor as claimed in claim 38 wherein said vortex generator defines an impeller for said liquid in one axial region of said radially inboard cavity.

40. A centrifugal gas compressor as claimed in claim 39 wherein each two-piece capillary channel has a respective capillary inlet channel at a radially inboard terminal end open to said radially inboard cavity, each radially inboard terminal end having one fluid inlet from a group of fluid inlets including: a fluid inlet normal to the axis of rotation of said container; and a fluid inlet tangential to the axis of rotation of said container.

41. A centrifugal gas compressor as claimed in claim 34 wherein each said capillary passage defines a micro-channel and wherein said plurality of capillary passages are divided into sub-pluralities and each sub-plurality of capillary passages being defined in a single disc, each disc having a radially inboard edge at said gap which defines a venturi jet input port of said two-piece capillary channel, and each disc having a radially outboard edge wherein the radially outboard terminal ends of the respective sub-plurality of capillary passages are open to said annular container space.

42. A centrifugal gas compressor as claimed in claim 41 wherein a plurality of discs define micro-channels for said plurality of capillary passages and each disc is mounted co-axially in said container.

43. A method for compressing a gas entrained in a liquid comprising:
providing a container rotatable about an axis with a plurality of capillary passages fixed in the container which lead radially to radially outboard ends terminating in a substantially annular container space;
ejecting a plurality of jets of gas through a gap filled with liquid, each gas jet creating a gas-liquid emulsion which is delivered to a corresponding capillary passage, each said gas jet being continuously radially aligned with a respective input port of each said capillary passage, said emulsion created by a venturi effect in said gap, the introduction of the gas-liquid emulsion into radially inboard ends of said plurality of capillary passages promotes capillary action on said liquid in said capillary passages;
rotating said container causing formation of gas bubbles in said capillary passages and compressing said gas bubbles towards the radially outboard ends of said capillary passages;
collecting liquid and entrained compressed gas bubbles in said annular container space; and
drawing off compressed gas released from bubbles buoyantly emerging from the gas-liquid mixture in said annular container space.

44. A centrifugal gas compressor fed with a gas and a liquid comprising:

a rotating container rotated by a prime mover about an axis;

said container having a radially inboard cavity and a plurality of capillary passages fixed in the container and having radially inboard ends open to said radially inboard cavity which lead radially to radially outboard ends terminating in a substantially annular container space;

each capillary passage defined by a two-piece capillary channel forming a venturi jet of liquid through a gap filled with gas, each venturi jet creating a gas-liquid emulsion which is fed across the gap to a corresponding capillary channel of a respective capillary passage, said two-piece capillary channel being continuously radially aligned;

emulsion subjected to capillary action as said emulsion passes through said plurality of capillary passages;

the plurality of capillary passages sized such that gas bubbles in said emulsion are trapped between slugs of liquid in said capillary passages due to centrifugal force of the spinning container, said centrifugal force on the liquid slugs being greater than a buoyancy of said gas bubbles in said capillary passage thereby moving said gas bubbles and liquid slugs to said annular container space and causing said gas to compress in the capillary passages;

a gas drain passage from said annular container space for drawing off compressed gas from the annular container space; and a liquid drain passage from said annular container space for drawing off liquid from the annular container space.

\* \* \* \* \*